(12) United States Patent
Tober et al.

(10) Patent No.: US 9,721,026 B1
(45) Date of Patent: Aug. 1, 2017

(54) SYSTEMS FOR TOPIC EXPLORATION AND RELATED METHODS

(71) Applicant: Searchmetrics GmbH, Berlin (DE)

(72) Inventors: Marcus Tober, Berlin (DE); Stephan Sommer-Schulz, Falkensee (DE); Isabeau Premont-Schwarz, Berlin (DE)

(73) Assignee: SEARCHMETRICS GMBH, Berlin (DE)

( * ) Notice: Subject to any disclaimer, the term of this patent is extended or adjusted under 35 U.S.C. 154(b) by 0 days.

(21) Appl. No.: 15/220,647

(22) Filed: Jul. 27, 2016

(51) Int. Cl.
*G06F 17/30* (2006.01)
*H04L 29/08* (2006.01)
*G06F 15/16* (2006.01)

(52) U.S. Cl.
CPC .... *G06F 17/30867* (2013.01); *G06F 17/3053* (2013.01); *G06F 17/30339* (2013.01); *G06F 17/30554* (2013.01); *G06F 17/30598* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 7,577,652 B1 | 8/2009 | Rajan et al. | |
| 7,788,254 B2 | 8/2010 | Burges et al. | |
| 8,332,395 B2 | 12/2012 | J. et al. | |
| 8,577,911 B1 | 11/2013 | Stepinski et al. | |
| 8,577,930 B2 | 11/2013 | Rajan et al. | |
| 8,689,108 B1 | 4/2014 | Duffield et al. | |
| 8,775,409 B1 | 7/2014 | Mehta et al. | |
| 2004/0220905 A1 | 11/2004 | Chen et al. | |
| 2010/0169300 A1 | 7/2010 | Liu et al. | |
| 2012/0185466 A1 | 7/2012 | Yamasaki et al. | |
| 2014/0108390 A1 | 4/2014 | Tao | |
| 2014/0164362 A1* | 6/2014 | Syed | G06F 17/30994 707/722 |
| 2015/0169725 A1* | 6/2015 | Jing | G06F 17/3028 707/737 |
| 2015/0363476 A1* | 12/2015 | Li | G06F 17/30569 707/714 |

OTHER PUBLICATIONS

G. Smith et al., "Generating unambiguous URL clusters from Web search." WSCD '09 Proceedings of the 2009 Workshop on Web Search Click Data, pp. 28-34 (Feb. 8, 2009).

* cited by examiner

*Primary Examiner* — Alex Gofman
(74) *Attorney, Agent, or Firm* — Bryan Cave LLP

(57) ABSTRACT

Some embodiments include a system. The system can include an input device, an output device, one or more processors, and one or more non-transitory memory storage devices storing computer instructions configured to run on the one or more processors and perform acts including: receiving a primary user search query; constructing a graphical visualization having multiple nodes and one or more edge connectors connecting one or more primary node pairs of the multiple nodes; and presenting the graphical visualization at an electronic display. The multiple nodes can include a first node associated with the primary user search query and one or more second nodes associated with one or more primary filtered search queries of multiple leading search queries related to the primary user search query. Other embodiments of related systems and methods are also provided.

16 Claims, 11 Drawing Sheets

SYSTEMS FOR TOPIC EXPLORATION AND RELATED METHODS

TECHNICAL FIELD

This disclosure relates generally to systems for topic exploration, and relates more particularly to computer systems permitting topic exploration through visualization and related methods.

BACKGROUND

People execute billions of search queries every day across a variety of platforms (e.g., web search engines, video-sharing search engines, social media search engines, etc.) to identify content. Often, people use different search queries to search for and identify the same or similar content. Understanding what content people are intending to identify when conducting a search query can help researchers and content producers to produce holistic and user-centric content. In order to understand what content people are intending to identify when conducting a search query, it can be helpful to understand how topics overlap and/or relate to each other. Accordingly, there is a need for systems and methods to explore related topics and to understand how the topics overlap and/or relate to each other.

BRIEF DESCRIPTION OF THE DRAWINGS

To facilitate further description of the embodiments, the following drawings are provided in which.

Figure 1:
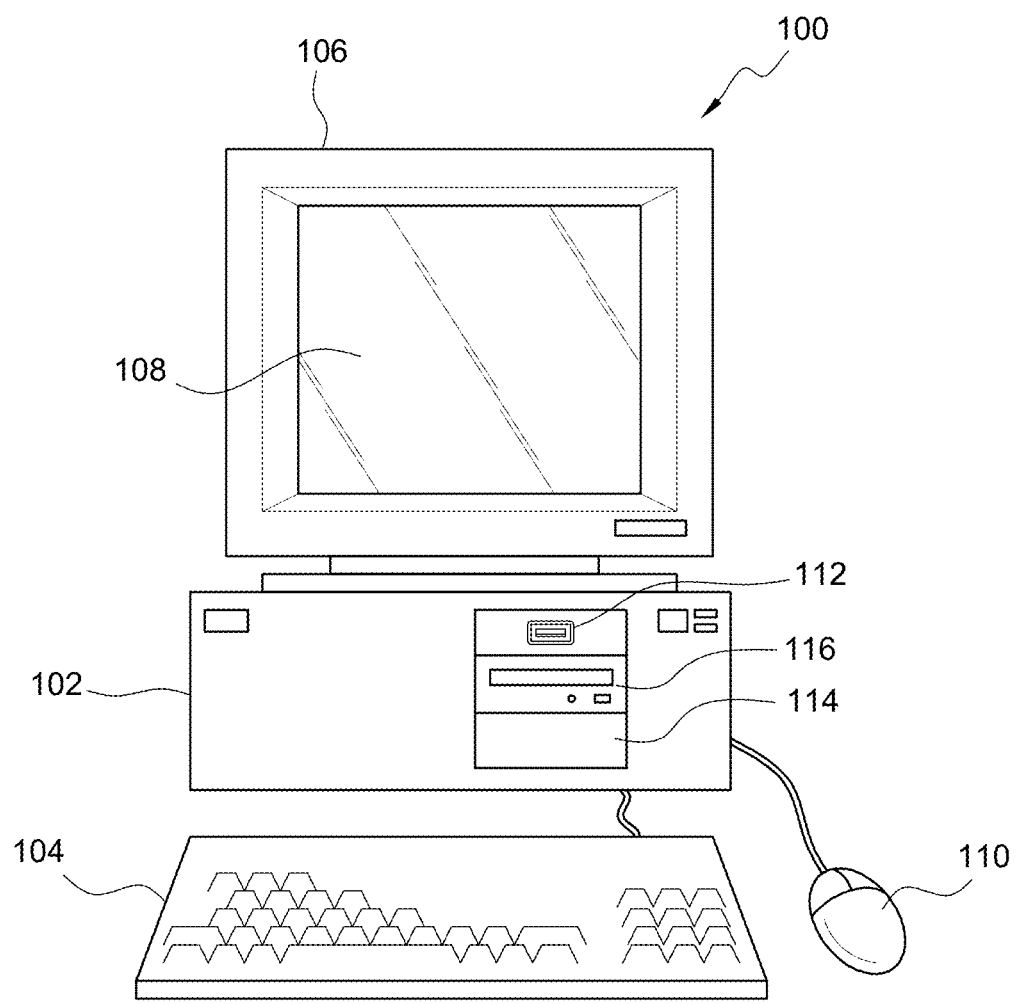
FIG. 1 illustrates a front elevational view of an exemplary computer system that is suitable to implement at least part of a central computer system, at least part of one or more user computer systems, and/or at least part of one or more third party computer systems of the system of FIG. 3, and/or to implement at least part of one or more of the activities of the method of FIG. 9 or one or more other methods described herein.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments include a system. The system can comprise an input device, an output device, one or more processors, and one or more non-transitory memory storage devices. The non-transitory memory storage device(s) can store computer instructions configured to run on the processor(s) and perform acts comprising: receiving a primary user search query; constructing a graphical visualization comprising multiple nodes and one or more edge connectors connecting one or more primary node pairs of the multiple nodes; and presenting the graphical visualization at an electronic display. The multiple nodes can comprise a first node associated with the primary user search query and one or more second nodes associated with one or more primary filtered search queries of multiple leading search queries related to the primary user search query. Meanwhile, constructing the graphical visualization comprising the multiple nodes and the edge connector(s) connecting the primary node pair(s) of the multiple nodes can comprise: identifying the multiple leading search queries; and identifying the one or more primary filtered search queries and one or more secondary filtered search queries. Any primary filtered search query of the one or more primary filtered search queries is not included in the one or more secondary filtered search queries, and the multiple leading search queries can comprise the one or more primary filtered search queries and the one or more secondary filtered search queries. Further, identifying the multiple leading search queries can comprise clustering together the multiple leading search queries using: (a) a uniform resource locator overlap assessment, (b) an auto-complete tool assessment, and/or (c) a keyword relation database assessment, and identifying the one or more primary filtered search queries and the one or more secondary filtered search queries can comprise: assigning query scores to the multiple leading search queries based on: (a) one or more node architecture assessments and/or (b) one or more node quality assessments; and identifying one or more first filtered search queries of the multiple leading search queries having one or more first query scores of the query scores that satisfy a threshold query score. The one or more primary filtered search queries can comprise the one or more first filtered search queries. Further still, constructing the graphical visualization comprising the multiple nodes and the edge connector(s) connecting the primary node pair(s) of the multiple nodes further can comprise: assigning one or more node pair strength scores to one or more node pairs of the multiple nodes based on one or more node pair strength assessments; and identifying one or more first node pairs of the node pair(s) of the multiple nodes having one or more first node pair strength scores of the node pair strength score(s) that satisfy a threshold node pair strength score. The first node pair(s) can comprise the primary node pair(s), and the first node pairs can comprise two or more first node pairs. In these or other embodiments, constructing the graphical visualization comprising the multiple nodes and the edge connector(s) connecting the primary node pair(s) of the multiple nodes can further comprise paring down the two or more first node pairs to one or more third node pairs. The two or more first node pairs can comprise the one or more third node pairs, and the third node pair(s) can consist of the primary node pair(s). Also, the input device and the output device can be configured to permit an operator of the system to manage the one or more processors and the one or more non-transitory memory storage devices.

Further embodiments include a computer search engine optimization system. The computer search engine optimization system can comprise an input device, an output device, one or more processors, and one or more non-transitory memory storage devices. The non-transitory memory storage device(s) can store computer instructions configured to run on the processor(s) and perform acts comprising: receiving a primary user search query; constructing a graphical visualization comprising multiple nodes and one or more edge connectors connecting one or more primary node pairs of the multiple nodes; and presenting the graphical visualization at an electronic display. Meanwhile, the multiple nodes can comprise a first node associated with the primary user search query and one or more second nodes associated with one or more primary filtered search queries of multiple leading search queries related to the primary user search query. Further, constructing the graphical visualization comprising the multiple nodes and the edge connector(s) connecting the primary node pair(s) of the multiple nodes can comprise: identifying the multiple leading search queries; and identifying the one or more primary filtered search queries and one or more secondary filtered search queries. Any primary filtered search query of the one or more primary filtered search queries is not included in the one or more secondary filtered search queries, and the multiple leading search queries can comprise the one or more primary filtered search queries and the one or more secondary filtered search queries. Also, the input device and the output device can be configured to permit an operator of the computer search engine optimization system to manage the processor(s) and the non-transitory memory storage device(s).

Still further embodiments include a computer search engine optimization system. The computer search engine optimization system can comprise an input device, an output device, one or more processors, and one or more non-transitory memory storage devices. The non-transitory memory storage device(s) can store computer instructions configured to run on the processor(s) and perform acts comprising: receiving a primary user search query; constructing multiple visualizations comprising a first visualization of multiple nodes and a second visualization of one or more edge connectors associating one or more primary node pairs of the multiple nodes; and presenting at least one of the multiple visualizations at an electronic display. Meanwhile, the multiple nodes can comprise a first node associated with the primary user search query and one or more second nodes associated with one or more primary filtered search queries of multiple leading search queries related to the primary user search query. Further, constructing the multiple visualizations comprising the first visualization of the multiple nodes and the second visualization of the one or more edge connectors associating one or more primary node pairs of the multiple nodes can comprise: identifying the multiple leading search queries; and identifying the one or more primary filtered search queries and one or more secondary filtered search queries. Any primary filtered search query of the one or more primary filtered search queries is not included in the one or more secondary filtered search queries, and the multiple leading search queries can comprise the one or more primary filtered search queries and the one or more secondary filtered search queries. Further, the first visualization of the multiple nodes comprises a first table of the multiple nodes, and the second visualization of the edge connector(s) comprises a second table of the edge connector(s). Also, the input device and the output device can be configured to permit an operator of the computer search engine optimization system to manage the processor(s) and the non-transitory memory storage device(s).

Other embodiments include a computer search engine optimization method. The computer search engine optimization method can comprise: executing one or more first computer instructions configured to receive a primary user search query; executing one or more second computer instructions configured to construct a graphical visualization comprising multiple nodes and one or more edge connectors connecting one or more primary node pairs of the multiple nodes, the multiple nodes comprising a first node associated with the primary user search query and one or more second nodes associated with one or more primary filtered search queries of multiple leading search queries related to the primary user search query; and executing one or more third computer instructions configured to present the graphical visualization at an electronic display. Executing the second computer instruction(s) can comprise: executing one or more fourth computer instructions configured to identify the multiple leading search queries; and executing one or more fifth computer instructions configured to identify the one or more primary filtered search queries and one or more secondary filtered search queries. Meanwhile, any primary filtered search query of the one or more primary filtered search queries is not included in the one or more secondary filtered search queries, and the multiple leading search queries can comprise the one or more primary filtered search queries and the one or more secondary filtered search queries. The first computer instruction(s), the second computer instruction(s), and the third computer instruction(s) can be configured to run at one or more processors and configured to be stored at one or more non-transitory memory storage devices.

Turning to the drawings, FIG. 1 illustrates an exemplary embodiment of a computer system 100, all of which or a portion of which can be suitable for (i) implementing part or all of one or more embodiments of the techniques, methods, and/or systems described herein, and/or (ii) implementing and/or operating part or all of one or more embodiments of the memory storage device(s) described herein. In many embodiments, computer system 100 can comprise a chassis 102, a keyboard 104, a computer monitor 106, and/or a mouse 110. Further, chassis 102 can contain one or more circuit boards (not shown), and/or computer monitor 106 can comprise a screen 108. In some embodiments, chassis 102 can contain one or more Universal Serial Bus (USB) ports 112, one or more hard drives 114, and/or one or more optical disc drives 116. Meanwhile, optical disc drive(s) 116 can comprise a Compact Disc Read-Only Memory (CD-ROM), a Digital Video Disc (DVD) drive, and/or a Blu-ray drive. Still, in other embodiments, a different or separate one of chassis 102 (and its internal components) can be suitable for implementing part or all of one or more embodiments of the techniques, methods, and/or systems described herein. Further, one or more elements of computer system 100 (e.g., keyboard 104, computer monitor 106, and/or mouse 110, etc.) can also be appropriate for implementing part or all of one or more embodiments of the techniques, methods, and/or systems described herein.

Figure 2:
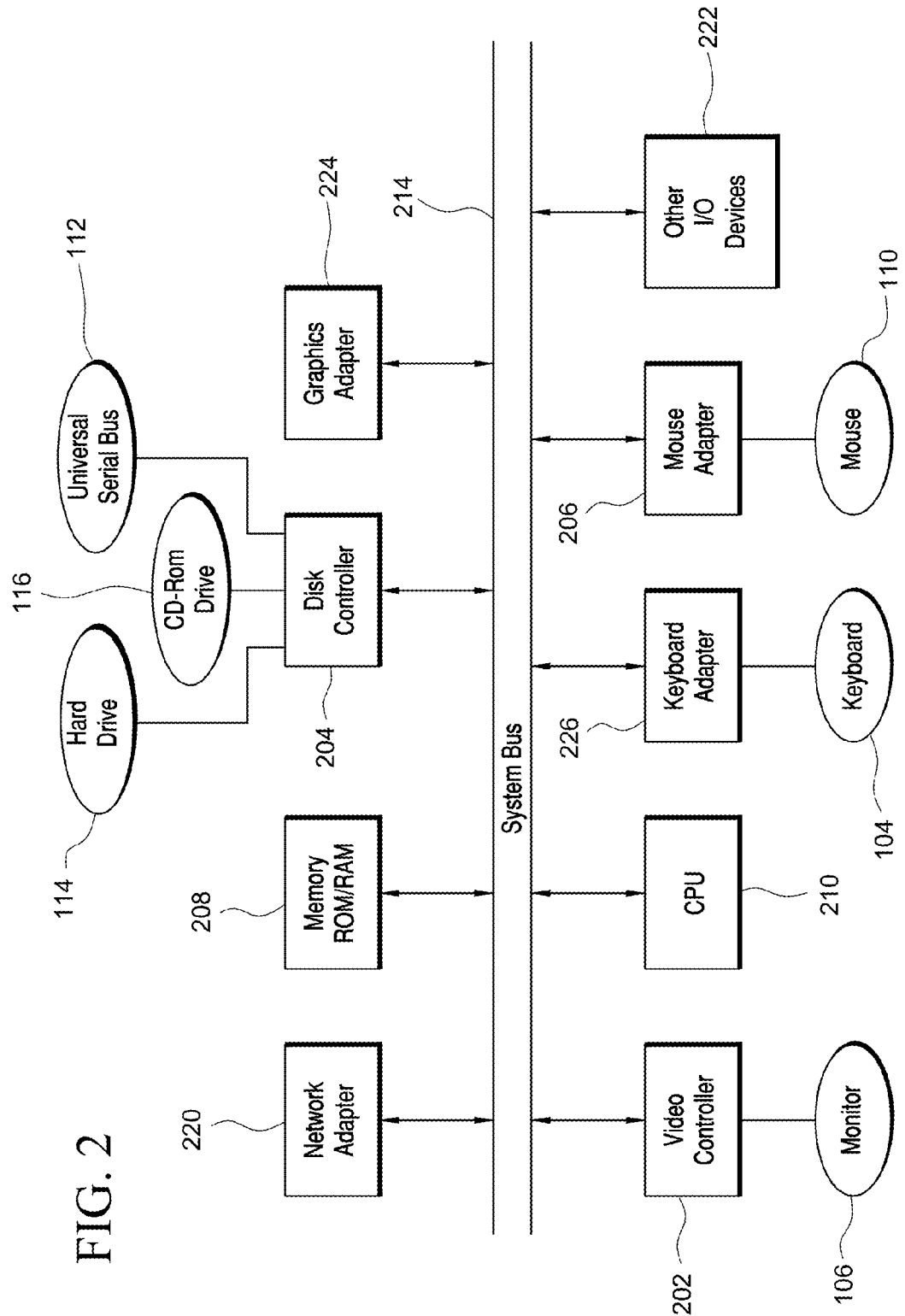
FIG. 2 illustrates a representative block diagram of exemplary elements included on the circuit boards inside a chassis of the computer system of FIG. 1.

Turning ahead in the drawings, FIG. 2 illustrates a representative block diagram of exemplary elements included on the circuit boards inside chassis 102 (FIG. 1). For example, a central processing unit (CPU) 210 can be coupled to a system bus 214. In various embodiments, the architecture of CPU 210 can be compliant with any of a variety of commercially distributed architecture families.

Meanwhile, system bus 214 can be coupled to a memory storage unit 208. Memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can comprise removable and/or non-removable non-volatile memory. In some embodiments, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In some embodiments, memory storage unit 208 can comprise hard drive(s) 114 (FIGS. 1 & 2). In these or other embodiments, the memory storage devices(s) of the various embodiments disclosed herein can comprise memory storage unit 208, an external memory storage drive (not shown), such as, for example, one or more USB-equipped electronic memory storage drives coupled to one or more of USB port(s) 112 (FIGS. 1 & 2), hard drive(s) 114 (FIGS. 1 & 2), one or more floppy disk drives (not shown), one or more optical discs (not shown), one or more magneto-optical discs (now shown), one or more magnetic tapes (not shown), etc. Exemplary optical discs can comprise one or more compact discs (CDs), one or more digital video discs (DVDs), and/or one or more Blu-ray discs. As used herein, the terms non-volatile or non-transitory memory storage devices(s) refer to the portions of the memory storage device(s) that are non-volatile (e.g., non-transitory) memory.

In various examples, portions of the memory storage device(s) of the various embodiments disclosed herein (e.g., portions of the non-volatile memory storage devices(s)) can be encoded with a boot code sequence suitable for restoring computer system 100 (FIG. 1) to a functional state after a system reset. In addition, portions of the memory storage device(s) of the various embodiments disclosed herein (e.g., portions of the non-volatile memory storage device(s)) can comprise microcode such as a Basic Input-Output System (BIOS) or Unified Extensible Firmware Interface (UEFI) operable with computer system 100 (FIG. 1). In the same or different examples, portions of the memory storage device(s) of the various embodiments disclosed herein (e.g., portions of the non-volatile memory storage device(s)) can comprise an operating system, which can be a software program that manages the hardware and software resources of a computer and/or a computer network. Meanwhile, the operating system can perform basic tasks such as, for example, controlling and allocating memory, prioritizing the processing of instructions, controlling input and output devices, facilitating networking, and managing files. Exemplary operating systems can comprise (i) Microsoft® Windows® operating system (OS) by Microsoft Corp. of Redmond, Wash., United States of America, (ii) Mac® OS by Apple Inc. of Cupertino, Calif., United States of America, (iii) UNIX® OS, and (iv) Linux® OS. Further exemplary operating systems can comprise (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States of America, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

As used herein, "processor" and/or "processing device" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the processor(s) of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 can be coupled to keyboard 104 (FIGS. 1 & 2) and mouse 110 (FIGS. 1 & 2), respectively, of computer system 100 (FIG. 1). While graphics adapter 224 and video controller 202 are illustrated as distinct units in FIG. 2, in other embodiments, video controller 202 can be integrated into graphics adapter 224, or vice versa. Video controller 202 is suitable to operate computer monitor 106 (FIGS. 1 & 2) to display images on screen 108 (FIG. 1) of computer system 100 (FIG. 1). Disk controller 204 can control hard drive(s) 114 (FIGS. 1 & 2), USB port(s) 112 (FIGS. 1 & 2), and optical drive(s) 116 (FIGS. 1 & 2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or one of USB port(s) 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage device(s) of the various embodiments disclosed herein can be executed by CPU 210 (FIG. 2). At least a portion of the program instructions, stored on these devices, can be suitable for carrying out at least part of the techniques and methods described herein. In various embodiments, computer 100 can be reprogrammed with one or more modules, applications, and/or databases to convert computer system 100 from a general purpose computer to a special purpose computer. For purposes of illustration, programs and other executable program components are shown herein as discrete systems, although it is understood that such programs and program components may reside at various times in memory storage device(s) of computing device 100, and can be executed by CPU 210 (FIG. 2). Alternatively, or in addition to, the techniques, methods, and/or systems described herein described herein can be implemented in hardware, or a combination of hardware, software, and/or firmware. For example, one or more application specific integrated circuits (ASICs) can be programmed to carry out one or more of the techniques, methods, and/or systems described herein. For example, one or more of the programs and/or executable program components described herein can be implemented in one or more ASICs.

Further, although computer system 100 is illustrated as a desktop computer in FIG. 1, in many examples, computer system 100 can have a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smart phone. In certain additional embodiments, computer system 100 may comprise an embedded system.

Figure 3:
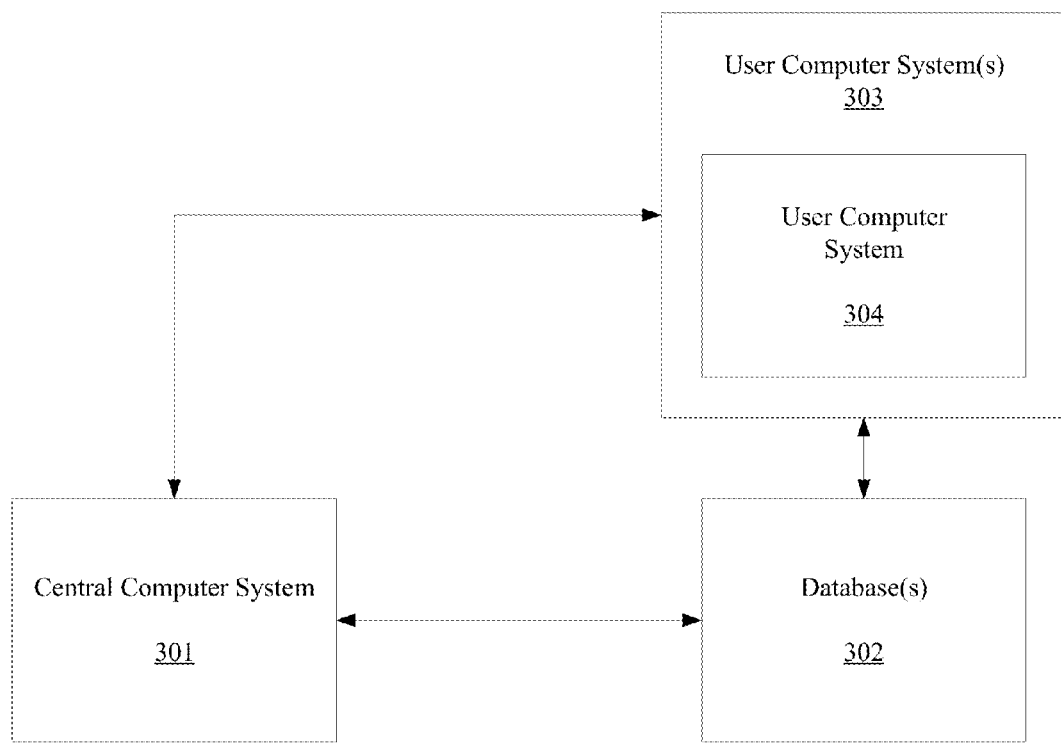
FIG. 3 illustrates a representative block diagram of a system, according to an embodiment.
Figure 9:
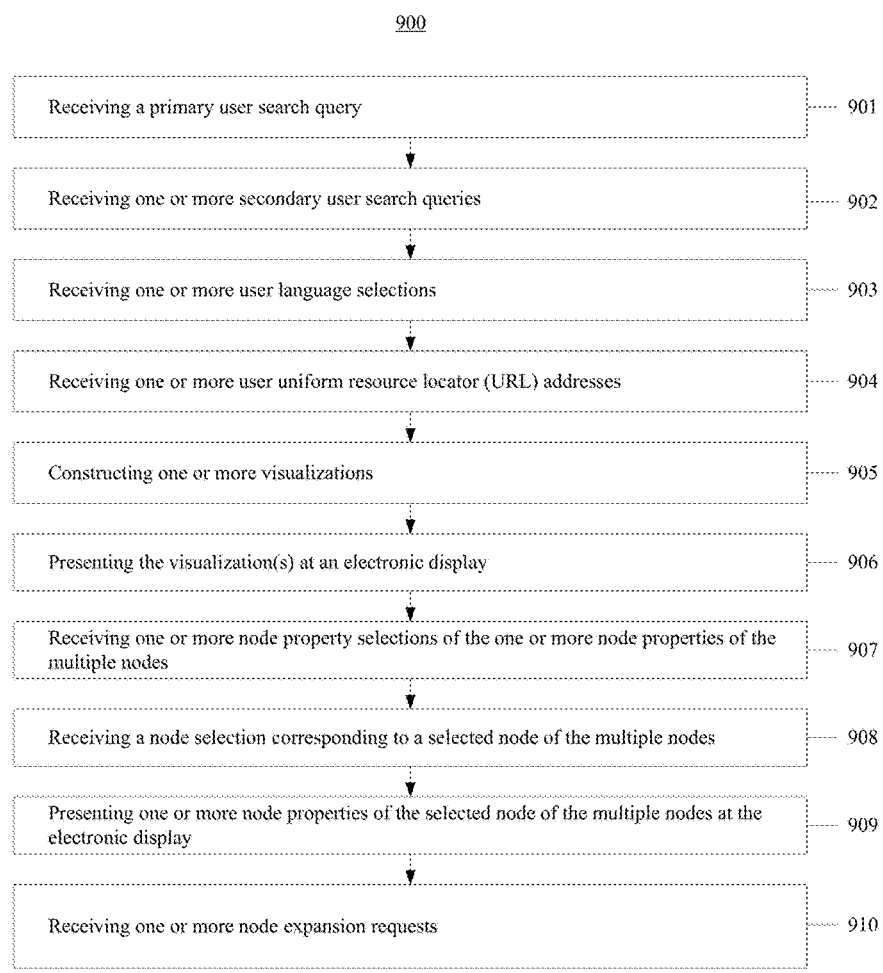
FIG. 9 illustrates a flow chart for a method, according to an embodiment.

Skipping ahead now in the drawings, FIG. 3 illustrates a representative block diagram of a system 300, according to an embodiment. In many embodiments, system 300 can comprise a computer search engine optimization system. In some embodiments, system 300 can be implemented to perform part or all of a method. The method can be similar or identical to method 900 (FIG. 9).

System 300 is merely exemplary and embodiments of the system are not limited to the embodiments presented herein. System 300 can be employed in many different embodiments or examples not specifically depicted or described herein. In some embodiments, certain elements, devices, or modules of system 300 can perform various methods and/or activities of those methods. In these or other embodiments, the methods and/or the activities of the methods can be performed by other suitable elements, devices, or modules of system 300.

As explained in greater detail below, system 300 can be operable to: (i) receive one or more user search queries (e.g., a primary user search query) of a user of system 300, and (ii) construct one or more visualizations (e.g., one or more graphical visualizations, one or more tabular visualizations, etc.) based on the one or more search queries. For example, the primary user search query can be associated with a topic, and the visualization(s) can show an overlap and/or one or more relationships of the topic and one or more other topics relating to the topic. Further, in many embodiments, system 300 can be operable to present (e.g., display) the graphical visualization to the user of system 300, such as, for example, at an electronic display. Accordingly, the visualization(s) constructed by system 300 can permit the user of system 300 to explore the topic by seeing one or more other topics relating to that topic and understanding the overlap and/or one or more relationships of some or all of the topics to each other. Consequently, system 300 can provide users with context about particular topics so that users of system 300 can better understand what content people are intending to identify when conducting a search query and can produce holistic and user-centric content based on that understanding.

Generally, therefore, system 300 can be implemented with hardware and/or software, as described herein. In some embodiments, at least part of the hardware and/or software can be conventional, while in these or other embodiments, part or all of the hardware and/or software can be customized (e.g., optimized) for implementing part or all of the functionality of system 300 described herein.

Specifically, system 300 can comprise a central computer system 301. In many embodiments, central computer system 301 can be similar or identical to computer system 100 (FIG. 1). Accordingly, central computer system 301 can comprise one or more processors and one or more memory storage devices (e.g., one or more non-transitory memory storage devices). In these or other embodiments, the processor(s) and/or the memory storage device(s) can be similar or identical to the processor(s) and/or memory storage device(s) (e.g., non-transitory memory storage device(s)) described above with respect to computer system 100 (FIG. 1). In some embodiments, central computer system 301 can comprise a single computer or server, but in many embodiments, central computer system 301 comprises a cluster or collection of computers or servers and/or a cloud of computers or servers. Meanwhile, central computer system 301 can comprise one or more input devices (e.g., one or more keyboards, one or more keypads, one or more pointing devices such as a computer mouse or computer mice, one or more touchscreen displays, etc.), and/or can comprise one or more output devices (e.g., one or more computer monitors, one or more touch screen displays, one or more speakers, etc.). The input device(s) can comprise one or more devices configured to receive one or more inputs, and/or the output device(s) can comprise one or more devices configured to provide (e.g., present, display, emit, etc.) one or more outputs. For example, in these or other embodiments, one or more of the input device(s) can be similar or identical to keyboard 104 (FIG. 1) and/or a mouse 110 (FIG. 1). Further, one or more of the output device(s) can be similar or identical to computer monitor 106 (FIG. 1) and/or screen 108 (FIG. 1). The input device(s) and the output device(s) can be coupled to the processor(s) and/or the memory storage device(s) of central computer system 301 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the output device(s) to the processor(s) and/or the memory storage device(s). In some embodiments, the KVM switch also can be part of central computer system 301. In a similar manner, the processor(s) and the memory storage device(s) can be local and/or remote to each other.

In many embodiments, central computer system 301 is configured to communicate with one or more user computer systems 303 (e.g., a user computer system 304) of one or more users of system 300. For example, the user(s) can interface (e.g., interact) with central computer system 301, and vice versa, via user computer system(s) 303. In some embodiments, system 300 can comprise user computer system(s) 303.

In many embodiments, central computer system 301 can refer to a back end of system 300 operated by an operator and/or administrator of system 300. In these or other embodiments, the operator and/or administrator of system 300 can manage central computer system 301, the processor(s) of central computer system 301, and/or the memory storage device(s) of central computer system 301 using the input device(s) and/or output device(s) of central computer system 301.

Like central computer system 301, user computer system(s) 303 each can be similar or identical to computer system 100 (FIG. 1), and in many embodiments, each of user computer system(s) 303 can be similar or identical to each other. In many embodiments, user computer system(s) 303 can comprise one or more desktop computer devices, one or more wearable user computer devices, and/or one or more mobile devices, etc. At least part of central computer system 301 can be located remotely from user computer system(s) 303.

In some embodiments, a mobile device can refer to a portable electronic device (e.g., an electronic device easily conveyable by hand by a person of average size) with the capability to present audio and/or visual data (e.g., images, videos, music, etc.). For example, a mobile device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can comprise a volume and/or weight sufficiently small as to permit the mobile device to be easily conveyable by hand. For examples, in some embodiments, a mobile device can occupy a volume of less than or equal to approximately 189 cubic centimeters, 244 cubic centimeters, 1790 cubic centimeters, 2434 cubic centimeters, 2876 cubic centimeters, 4056 cubic centimeters, and/or 5752 cubic centimeters. Further, in these embodiments, a mobile device can weigh less than or equal to 3.24 Newtons, 4.35 Newtons, 15.6 Newtons, 17.8 Newtons, 22.3 Newtons, 31.2 Newtons, and/or 44.5 Newtons.

Exemplary mobile devices can comprise, but are not limited to, one of the following: (i) an iPod®, iPhone®, iPod Touch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia®, Surface Pro™, or similar product by the Microsoft Corporation of Redmond, Wash., United States of America, and/or (iv) a Galaxy™, Galaxy Tab™, Note™, or similar product by the Samsung Group of Samsung Town, Seoul, South Korea. Further, in the same or different embodiments, a mobile device can comprise an electronic device configured to implement one or more of (i) the iOS™ operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by Google, Inc. of Mountain View, Calif., United States, (v) the Windows Mobile™, Windows Phone™ and Windows 10 (mobile)™ operating systems by Microsoft Corporation of Redmond, Wash., United States of America, or (vi) the Symbian™ operating system by Nokia Corp. of Keilaniemi, Espoo, Finland.

Meanwhile, in many embodiments, for reasons explained later herein, central computer system 301 also can be configured to communicate with one or more databases 302 (e.g., one or more general search query databases 551 (FIG. 5), one or more leading search query databases 552 (FIG. 5), etc.). Database(s) 302 can be stored on one or more memory storage devices (e.g., one or more non-transitory memory storage devices), which can be similar or identical to the memory storage device(s) (e.g., non-transitory memory storage device(s)) described above with respect to computer system 100 (FIG. 1). Also, in some embodiments, for any particular database of database(s) 302, that particular database can be stored on a single memory storage device (e.g., non-transitory memory storage device) of the memory storage device(s) (e.g., non-transitory memory storage device(s)) storing database(s) 302 or it can be spread across multiple of the memory storage device(s) (e.g., non-transitory memory storage device(s)) storing search content database(s) 302, depending on the size of the particular database and/or the storage capacity of the memory storage devices(s) (e.g., non-transitory memory storage device(s)).

In these or other embodiments, the memory storage device(s) of central computer system 301 can comprise some or all of the memory storage device(s) storing database(s) 302. In further embodiments, some of the memory storage device(s) storing database(s) 302 can be part of one or more of user computer system(s) 303 and/or one or more third-party computer systems (i.e., other than central computer system 301 and/or user computer system(s) 303), and in still further embodiments, all of the memory storage device(s) storing database(s) 302 can be part of one or more of user computer system(s) 303 and/or one or more of the third-party computer system(s). Like central computer system 301 and/or user computer system(s) 303, when applicable, each of the third-party computer system(s) can be similar or identical to computer system 100 (FIG. 1). Notably, for simplicity, and because third-party computer systems may be omitted in some embodiments, the third-party computer systems are not shown at FIG. 3. Meanwhile, database(s) 302 are illustrated at FIG. 3 apart from central computer system 301 and user computer system(s) 303 to better illustrate that search content database(s) 302 can be stored at memory storage device (s) of central computer system 301, user computer system(s) 303, and/or the third-party computer system(s), depending on the manner in which system 300 is implemented.

Database(s) 302 each can comprise a structured (e.g., indexed) collection of data and can be managed by any suitable database management systems configured to define, create, query, organize, update, and manage search content database(s). Exemplary database management systems can include MySQL (Structured Query Language) Database, PostgreSQL Database, Microsoft SQL Server Database, Oracle Database, SAP (Systems, Applications, & Products) Database and IBM DB2 Database.

Meanwhile, communication between central computer system 301, user computer system(s) 303, the third-party computer system(s), and/or database(s) 302 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), Powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Data Over Cable Service Interface Specification (DOCSIS), Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.

For simplicity, the functionality of system 300 is described generally herein as it relates particularly to user computer system 304, a single user, and a single primary user search query, but in many embodiments, the functionality of system 300 can be extended to multiple (e.g., all) of user computer system(s) 303, multiple users, and multiple primary user search queries at the same or at different times. Further, although system 300 is primarily described with respect to web search queries, in these or other embodiments, system 300 can also be implemented with other types of search queries (e.g., video-sharing search queries, social media search queries, etc.).

Figure 4:
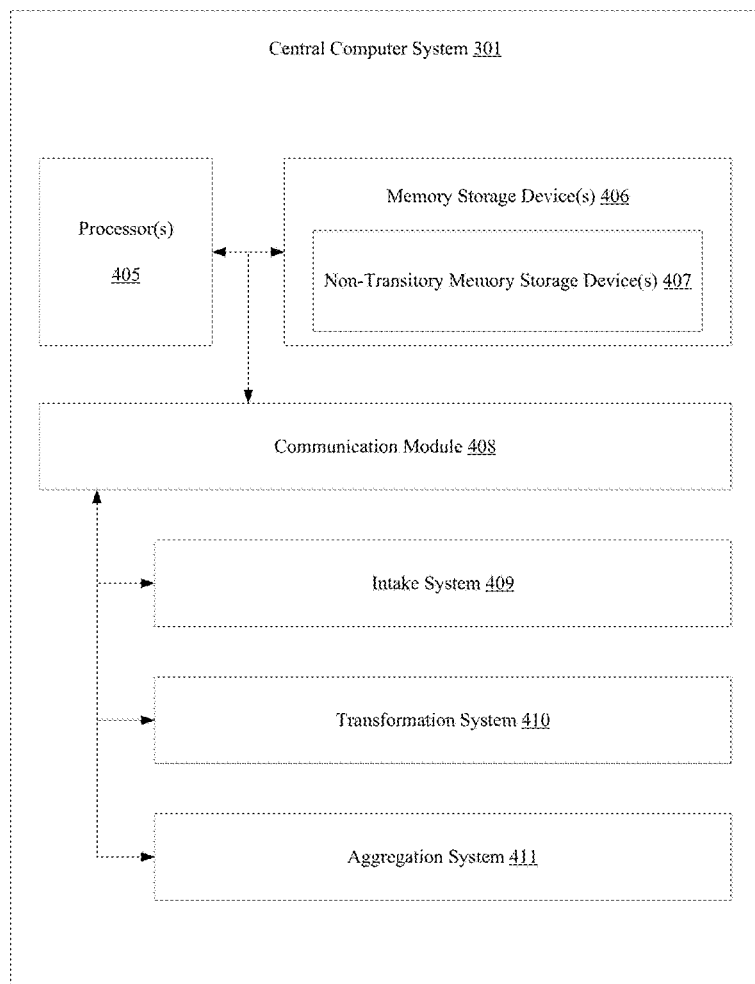
FIG. 4 illustrates a representative block diagram of a central computer system of the system of FIG. 3, according to the embodiment of FIG. 3.
Figure 5:
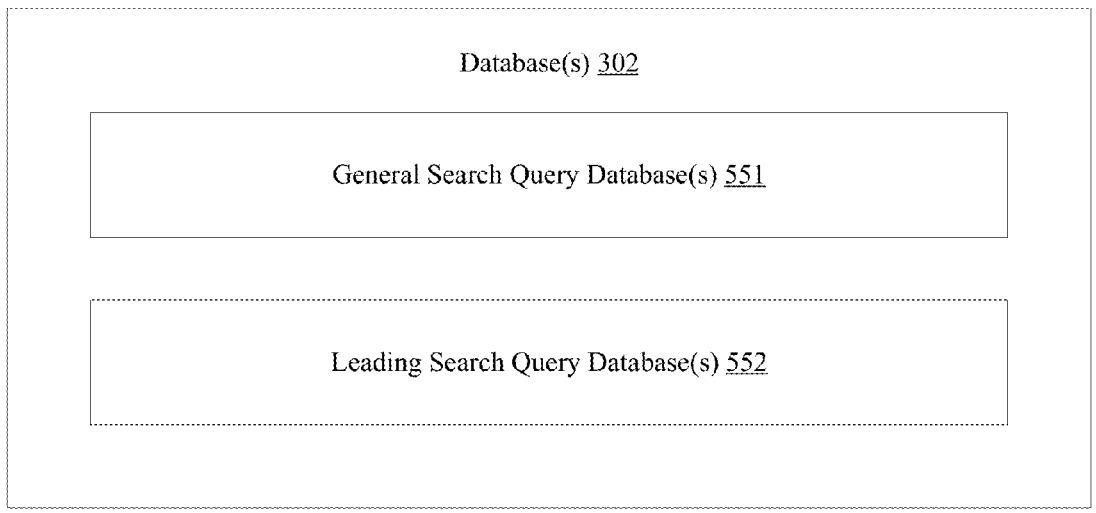
FIG. 5 illustrates a representative block diagram of one or more databases of the system of FIG. 3, according to the embodiment of FIG. 3.

Turning ahead now in the drawings, FIG. 4 illustrates a representative block diagram of central computer system 301, according to the embodiment of FIG. 3; and FIG. 5 illustrates a representative block diagram of database(s) 302, according to the embodiment of FIG. 3.

Referring first to FIG. 4, in many embodiments, central computer system 301 can comprise one or more processors 405 and one or more memory storage devices 406. Further, memory storage device(s) 406 can comprise one or more non-transitory memory storage devices 407.

Meanwhile, in these or other embodiments, central computer system 301 comprises a communication system 408, an intake system 409, a visualization system 410, and a presentation system 411. In these or other embodiments, part or all of at least one or more of communication system 408, intake system 409, visualization system 410, and/or presentation system 411 can be part of at least one or more others of communication system 408, intake system 409, visualization system 410, and/or presentation system 411, and vice versa.

Referring briefly to FIG. 5, as explained in greater detail below, database(s) 302 can comprise one or more constituent databases. For example, in some embodiments, database(s) 302 can comprise general search query database(s) 551 (FIG. 5) and leading search query database(s) 552 (FIG. 5).

Returning now back to FIG. 4, in many embodiments, processor(s) 405 can be similar or identical to the processor (s) described above with respect to computer system 100 (FIG. 1) and/or central computer system 301 (FIG. 3); memory storage device(s) 406 can be similar or identical to the memory storage device(s) described above with respect to computer system 100 (FIG. 1) and/or central computer system 301 (FIG. 3); and/or non-transitory memory storage device(s) 407 can be similar or identical to the non-transitory memory storage device(s) described above with respect to computer system 100 (FIG. 1) and/or central computer system 301 (FIG. 3). Further, communication system 408, intake system 409, visualization system 410, and/or presentation system 411 can be implemented with hardware and/or software, as desirable. Although communication system 408, intake system 409, visualization system 410, and/or presentation system 411 are shown at FIG. 4 as being separate from processor(s) 405, memory storage device(s) 406, and/or non-transitory memory storage device(s) 407, in many embodiments, part or all of communication system 408, intake system 409, visualization system 410, and/or presentation system 411 can be stored at memory storage device(s) 406 and/or non-transitory memory storage device(s) 407 and can be called and run at processor(s) 405, such as, for example, when the part or all of communication system 408, intake system 409, visualization system 410, and/or presentation system 411 are implemented as software.

Communication System 408

Communication system 408 is operable to provide and manage communication between the various elements of central computer system 301 (e.g., processor(s) 405, memory storage device(s) 406, non-transitory memory storage device(s) 407, intake system 409, visualization system 410, and/or presentation system 411, etc.) and manage incoming and outgoing communications between central computer system 301 (FIG. 3) and user computer system(s) 303 of FIG. 3 (e.g., user computer system 304 (FIG. 3)), the third party computer system(s), and/or database(s) 302 (FIG. 3). Like the communications between central computer system 301 (FIG. 3), user computer system(s) 303 (FIG. 3), the third party computer system(s), and/or database(s) 302 (FIG. 3), communication system 408 can be implemented using any suitable manner of wired and/or wireless communication, and/or using any one or any combination of wired and/or wireless communication network topologies and/or protocols, as described above with respect to the central computer system 301 (FIG. 3), user computer system(s) 303 (FIG. 3), the third party computer system(s), and/or database(s) 302 (FIG. 3). In many embodiments, communication system 408 can be part of hardware and/or software implemented for communications between central computer system 301 (FIG. 3), user computer system(s) 303 (FIG. 3), the third party computer system(s), and/or database(s) 302 (FIG. 3). For example, as applicable, communication system 408 can permit processor(s) 405 to call (i) software (e.g., at least part of intake system 409, visualization system 410, and/or presentation system 411, etc.) stored at memory storage device(s) 406 and/or non-transitory memory storage device(s) 407, and/or (ii) data stored at memory storage device(s) 406, at non-transitory memory storage device(s) 407, and/or in database(s) 302 (FIG. 3).

Intake System 409

Intake system 409 is operable to receive one or more user search queries of a user of system 300 (FIG. 3). For example, in many embodiments, a search query can comprise one or more words (e.g., keywords).

In implementation, intake system 409 can receive the one or more user search queries from the user (e.g., from user computer system 304 of the user) via communication system 408. For example, in many embodiments, the user can enter the one or more user search queries at a graphic user interface displayed at an electronic display of user computer system 304 using one or more input device(s) (e.g., a keyboard and/or mouse) of user computer system 304, and user computer system 304 can provide the one or more user search queries to intake system 409 via communication system 408.

In these embodiments, intake system 409 can receive a primary user search query of the user of system 300 (FIG. 3). The primary user search query can be associated with a topic. For example, the topic can be a topic that the user wants to explore. In particular, the user may want to see other topics relating to that topic, and to understand the overlap and/or one or more relationships of some or all of the topics to each other. Meanwhile, in some embodiments, intake system 409 can receive one or more secondary user search queries. The roles of the primary user search query and the one or more secondary user search queries with respect to system 300 (FIG. 3) are explained in greater detail below in context with visualization system 410.

In some embodiments, intake system 409 can receive (i) one or more node property selections of the user of system 300 (FIG. 3), (ii) one or more node selections of the user of system 300 (FIG. 3), one or more node expansion requests, (iv) one or more user language selections, and/or (v) one or more user uniform resource locators (URL) addresses. In these or other embodiments, a node property selection can correspond to a selected node property of multiple nodes of the visualization(s) constructed by visualization system 410, as described below, and a node selection or node expansion request can correspond to a selected node of multiple nodes of the visualization(s) constructed by visualization system 410, as described below. Meanwhile, a user language selection can refer to a language preference of the user of system 300 (FIG. 3), and a user URL address can refer to a URL address of the user of system 300 (FIG. 3). The roles of the node property selection(s), the one or more node properties, the node selection(s), the node expansion request(s), the multiple nodes, the user language selection(s), and the one or more user URL addresses with respect to system 300 (FIG. 3) are explained in greater detail below in context with visualization system 410 and presentation system 411.

In implementation, intake system 409 can receive the node property selection(s), the node selection(s), the node expansion request(s), the user language selection(s), and/or the one or more user URL addresses from the user (e.g., from user computer system 304 of the user) via communication system 408. For example, in many embodiments, the user can enter the node property selection(s), the node selection(s), the node expansion request(s), the user language selection(s), and/or the one or more user URL addresses at a graphic user interface displayed at an electronic display of user computer system 304 using one or more input device(s) (e.g., a keyboard and/or mouse) of user computer system 304, and user computer system 304 can provide the node selection(s), the node expansion request(s), the user language selection(s), and/or the one or more user URL addresses to intake system 409 via communication system 408.

Visualization System 410

Visualization system 410 is operable to construct one or more visualizations. The visualization(s) constructed by visualization system 410 can permit the user of system 300 to explore one or more other topics relating to the topic associated with the primary user search query and to understand the overlap and/or one or more relationships of some or all of the topics to each other. Although, in some embodiments, the visualization(s) constructed by visualization system 410 can comprise any visualization(s) suitable to permit a user of system 300 (FIG. 3) to explore the one or more other topics relating to the topic associated with the primary user search query and to understand an overlap and/or one or more relationships of some or all of the topics to each other, in many embodiments, the visualization(s) can comprise one or more graphical visualizations and/or one or more tabular visualizations, as explained below.

For example, in many embodiments, the visualization(s) constructed by visualization system 410 can comprise a spoke-hub graphical visualization. The visualization(s) (e.g., the spoke-hub graphical visualization) can comprise multiple nodes (e.g., hubs) and one or more edge connectors (e.g., spokes) associating (e.g., connecting) one or more pairs of the multiple nodes. As explained in greater detail below, in these or other embodiments, the edge connector(s) can associate (e.g., connect) one or more primary node pairs of the multiple nodes. Meanwhile, the multiple nodes can comprise (i) a first node associated with the primary user search query, which is associated with a topic as discussed above, and (ii) one or more second nodes associated with one or more primary filtered search queries, which are associated with one or more topics related to the topic associated with the primary user search query.

In many embodiments, visualization system 410 can identify (e.g., determine) multiple leading search queries. The multiple leading search queries can relate to the primary user search query. Visualization system 410 can receive the primary user search query from intake system 409 to permit visualization system 410 to identify the multiple leading search queries. In implementation, visualization system 410 can receive the primary user search query from intake system 409 via communication system 408.

For example, in order to identify the multiple leading search queries, visualization system 410 can identify (e.g., determine) and cluster together multiple search queries relating to the primary user search query to form the multiple leading search queries. Although, in some embodiments, the multiple leading search queries can be identified as being related to the primary user search query using any suitable method(s) of association, in many embodiments, visualization system 410 can identify the multiple leading search queries relating to the primary user search query using (a) a URL overlap assessment, (b) an auto-complete tool assessment, and/or (c) a keyword relation database assessment.

In many embodiments, a URL overlap assessment can refer to an analysis of how many URLs are shared in common in the search results of a pair of search queries (e.g., the primary user search query and a potential search query). When an overlap strength score of a particular pair of search queries satisfies a threshold URL overlap strength score (i.e., the search queries share enough search results in common with each other), the search queries can be considered related. Accordingly, search queries that satisfy the threshold URL overlap strength score when paired with the primary user search query can be considered related to the primary user search query for purposes of the URL overlap assessment. Equation 1, as follows, provides an exemplary equation for calculating a URL overlap strength score or a pair of search queries:

$$\text{Score}_{URL} = \frac{\log(10 * n_{urls} + n_{doms} + 1)}{\log(331)}, \quad (1)$$

where $n_{urls}$ represents a total number of URLs considered, $n_{doms}$ represents a number of URLs shared in common, and $\text{Score}_{URL}$ represents the URL overlap strength score. Implementing Equation 1 to calculate a URL overlap strength score can scale the URL overlap strength score to a range of 0 to 1. The threshold URL overlap strength score can be established by the user of system 300 (FIG. 3), by the operator of system 300 (FIG. 3), or by a third party, such as, for example, when the operator of system 300 (FIG. 3) does not maintain leading search query database(s) 552 (FIG. 5), as discussed below.

Meanwhile, an auto-complete tool assessment can refer to querying one or more auto-complete tools that implement one or more autocomplete algorithms to predict potential search queries based on a particular search query (e.g., the primary user search query) for one or more predicted potential search queries. The predicted potential search queries can be considered related to the primary user search query for purposes of the auto-complete tool assessment. Exemplary auto-complete tools can include an auto-complete tool by Google, Inc. of Mountain View, Calif., United States or an auto-complete tool by Microsoft Corporation of Redmond, Wash., United States of America.

Further, a keyword relation database assessment can refer to querying one or more keyword relation databases in which one or more terms (e.g., keywords) similar to particular terms (e.g., keywords) are aggregated for one or more terms (e.g., keywords) similar to one or more terms (e.g., keywords) of the primary user search query. The terms similar to the one or more terms of the primary user search query can be considered leading search queries related to the primary user search query for purposes of the keyword relation database assessment. For example, in many embodiments, the term(s) similar to a particular term can comprise synonyms of the particular term. Meanwhile, exemplary keyword relation databases can include the Google Adwords' Keyword Planner by Google, Inc. of Mountain View, Calif., United States or the Bing Ads Keyword Planner by Microsoft Corporation of Redmond, Wash., United States of America.

Although, in some embodiments, visualization system 410 can identify (e.g., determine) the multiple leading search queries on an as-needed basis, in many embodiments, visualization system 410 can reference leading search query database(s) 552 (FIG. 5) to obtain the multiple leading search queries for the primary user search query. For example, leading search query database(s) 552 (FIG. 5) can be pre-populated with potential primary user search queries and corresponding leading search queries for each of the potential search queries. While pre-populating leading search query database(s) 552 (FIG. 5) can be resource intensive, referencing leading searching query database(s) 552 (FIG. 5) to obtain the multiple leading search queries rather than identifying the multiple leading search queries on an as-needed basis can result in a more seamless experience for the user of system 300 (FIG. 3). In many embodiments, leading search query database(s) 552 (FIG. 5) can be pre-populated by applying (a) uniform resource locator (URL) overlap assessments, (b) auto-complete tool assessments, and/or (c) keyword relation database assessments to multiple general search queries aggregated in general search query database(s) 551 (FIG. 5). Meanwhile, general search query database(s) 551 can be populated by crawling one or more media sources. In many embodiments, the media source(s) can comprise one or more web pages of the Internet. However, in further embodiments, the media source(s) can be any suitable media source(s) available in an electronic format permitting crawling. Although, in many embodiments, the operator of system 300 (FIG. 3) can pre-populate and/or maintain leading search query database(s) 551 (FIG.

5), in some embodiments, a third party can pre-populate and/or maintain leading search query database(s) 551 (FIG. 5).

In many embodiments, visualization system 410 can identify (e.g., determine) and group together equivalent leading search queries of the multiple leading search queries. Meanwhile, visualization system 410 can regard the equivalent leading search queries as one (i.e., the same) leading search query for purposes of constructing the visualization(s). For example, visualization system 410 can group together equivalent leading search queries to omit superfluous information in order to simply the visualization(s) for the user of system 300 (FIG. 3). Which leading search queries qualify as equivalent leading search queries can depend on the particular embodiment of system 300 (FIG. 3). However, in many embodiments, equivalent leading search queries can comprise leading search queries that differ in spacing (e.g., "United States," "UnitedStates," and "U nited States"), that differ by minor (e.g., one letter) typographical variations (e.g., "United States" and "United States"), that differ by singularity versus plurality (e.g., "United State" and "United States"), and/or as acronyms (e.g., "United States" and "USA"). In some embodiments, visualization system 410 can implement (a) a Leveshtein distance assessment and/or (b) a stem assessment to identify and group together equivalent leading search queries of the multiple leading search queries.

In many embodiments, the multiple leading search queries identified by visualization system 410 can be filtered based on the user language selection(s) received by intake system 409. For example, visualization system 410 can limit the multiple leading search queries to search queries of the language(s) of the user language selection(s). In these or other embodiments, visualization system 410 can receive the user language selection(s) from intake system 409 via communication system 408.

In many embodiments, visualization system 410 can be operable to identify (e.g., determine) the one or more primary filtered search queries and one or more secondary filtered search queries. For example, the multiple leading search queries can comprise the one or more primary filtered search queries and the one or more secondary filtered search queries. In many embodiments, the multiple leading search queries can consist of the one or more primary filtered search queries and the one or more secondary filtered search queries. Meanwhile, visualization system 410 can be operable to identify the one or more primary filtered search queries and the one or more secondary filtered search queries from the multiple leading search queries, such as, for example, after visualization system 410 identifies the multiple leading search queries. In these or other embodiments, any primary filtered search queries are not included in (e.g., are exclusive of) any secondary filtered search queries, and vice versa.

In many embodiments, in order to identify the one or more primary filtered search queries and the one or more secondary filtered search queries, visualization system 410 can be operable to identify one or more first filtered search queries and one or more second filtered search queries. In these or other embodiments, such as, for example, when the one or more first filtered search queries comprise multiple first filtered search queries, visualization system 410 can be operable to identify one or more third filtered search queries. As will be better understood with the context provided below, the multiple leading search queries can comprise the one or more first filtered search queries, the one or more second filtered search queries, and/or the one or more third filtered search queries; the one or more primary filtered search queries can comprise the one or more first filtered search queries or the one or more third filtered search queries; the one or more first filtered search queries can comprise the one or more third filtered search queries; and the secondary filtered search queries can comprise the second filtered search queries, and in some embodiments, part of the one or more first filtered search queries.

For example, in order to identify the one or more first filtered search queries and the one or more second filtered search queries, in many embodiments, visualization system 410 can assign query scores to (e.g., calculate query scores for) the multiple leading search queries. Further, the visualization system 410 can identify one or more (e.g., any) leading search queries of the multiple leading search queries that satisfy a threshold query score (i.e., the one or more first filtered search queries) and one or more (e.g., any) leading search queries of the multiple leading search queries that fail to satisfy the threshold query score (i.e., the one or more second filtered search queries). In these or other embodiments, the threshold query score can operate as a gate to filter out less relevant search queries of the multiple leading search queries. Accordingly, visualization system 410 can separate the multiple leading search queries into a first group of the one or more first filtered search queries (e.g., more relevant search queries) and a second group of the one or more second filtered search queries (e.g., less relevant search queries). The threshold query score can be established by the user of system 300 (FIG. 3) or by the operator of system 300 (FIG. 3).

In many embodiments, visualization system 410 can assign query scores to (e.g., calculate query scores for) the multiple leading search queries based on (a) one or more node architecture assessments and/or (b) one or more node quality assessments. In some embodiments, a node architecture assessment can refer to an assessment of how specific pairs of nodes relate to each other, and a node quality assessment can refer to an assessment of how the primary user search query and one or more leading searching queries of the multiple leading search queries relate to each other. For example, in some embodiments, the node architecture assessment(s) can comprise (a) a root node relationship assessment and/or (b) a parent node relationship assessment. In these or other embodiments, the node quality assessment(s) can comprise (i) a query intention assessment, (ii) a query search volume assessment, (iii) a query seasonality assessment, (iv) a query cost per click assessment, (v) a query click through rate assessment, (vi) a query type assessment, (vii) a competitor URL assessment, (viii) a buying cycle assessment, and/or (ix) a keyword source assessment.

In many embodiments, a root node relationship assessment can refer to an analysis of how relevant a particular leading search query is relative to the primary user search query (e.g., a root-node strength score), and a parent node relationship assessment can refer to an analysis of how relevant a particular leading search query is to another leading search query (e.g., a parent-node strength score).

In specific examples, visualization system 410 can use (a) a URL overlap assessment (Equation 1) and/or (b) a word2vec assessment to identify (e.g., determine) how relevant the leading search query is relative to the primary user search query (i.e., to calculate a root-node strength score) and/or how relevant a leading search query is relative to another leading search query (i.e., to calculate a parent-node strength score).

A word2vec assessment can refer to an analysis of a word2vec score of a pair of search queries using one or more word2vec machine learning algorithms. For purposes of the root node relationship assessment, a particular leading search query can be compared to the primary user search query, and for purposes of the parent node relationship assessment, a particular leading search query can be compared to another leading search query. Equation 2, as follows, provides an exemplary equation for calculating a word2vec strength score of a pair of search queries:

$$\text{Score}_{w2v} = \max(0, w2v_{sim}(N1, N2)), \quad (2)$$

where N1 and N2 represent the relevant search queries of the pair of search queries, and $\text{Score}_{w2v}$ represents the word2vec strength score of the pair of search queries.

In some embodiments, visualization system 410 can use both (a) a URL overlap assessment (Equation 1) and (b) a word2vec assessment (Equation 2) when performing a root node relationship assessment and/or a parent node relationship assessment. For example, Equation 3, as follows, provides an exemplary equation for assigning a composite URL and word2vec score using both (a) a URL overlap assessment (Equation 1) and (b) a word2vec assessment (Equation 2):

$$\text{Score}_{URL/w2v} = ((1-\lambda) * \text{Score}_{URL}) + (\lambda(\text{Score}_{w2v})), \quad (3)$$

where $\text{Score}_{URL}$ represents the URL overlap strength score of the pair of search queries, $\text{Score}_{w2v}$ represents the word2vec strength score of the pair of search queries, and $\lambda$ represents a weighting coefficient. The weighting coefficient $\lambda$ can be established by the user of system 300 (FIG. 3) or by the operator of system 300 (FIG. 3), depending whether and to what extent the user or operator wants to assign different weights to the URL overlap strength score or the word2vec strength score of the pair of search queries.

Meanwhile, in many embodiments, a query intention assessment can refer to an analysis of a user intention of a particular leading search query (e.g., a buyer intention, an informed intention, or an amusement intention). For example, visualization system 410 can assign an intention score to the particular leading search query depending on the user intention of the particular leading search query.

In many embodiments, a query search volume assessment can refer to an analysis of a search volume of a particular leading search query. For example, visualization system 410 can calculate a search volume score for the particular leading search query.

In these or other embodiments, Equation 4, as follows, provides an exemplary equation for calculating a search volume score of a particular leading search query:

$$\text{score}_{sv}(n) = sv(n) + \alpha * \Sigma_{m \in N1(n)} sv(m) + \beta * \Sigma_{p \in N2(n)} sv(p), \quad (4)$$

where $\text{score}_{sv}(n)$ represents a search volume score of the particular leading search query, n represents the particular leading search query, sv is search volume as a function of a corresponding node (n, m, p, etc.), N1(n) represents a set of leading search queries directly associated with the particular leading search query, N2(n) represents a set of leading search queries directly related with the leading search queries of N1(n) excluding any leading search queries of N1(n), α represents a first weighting coefficient, and β represents a second weighting coefficient. The weighting coefficients α and β can be established by the user of system 300 (FIG. 3) or by the operator of system 300 (FIG. 3), depending whether and to what extent the user or operator wants to assign different weights to the search volume of the leading search queries of N1(n) and N2(n).

In these or other embodiments, Equation 5, as follows, provides another exemplary equation for calculating a search volume score of a particular leading search query:

$$\text{score}_{sv}(n) = sv(n) + \alpha * \sum_{m \in N1(n)} (\sigma(n,m) * sv(m)) + \beta * \sum_{p \in \binom{N1(m)}{N1(n)}} \sum_{p \in N2(n)} (\sigma(n,m) * \sigma(m,p) * sv(p)), \quad (5)$$

where $\text{score}_{sv}(n)$ represents a search volume score of the particular leading search query, n represents the particular leading search query, sv is search volume as a function of a corresponding node (n, m, p, etc.), N1(n) represents a set of leading search queries directly associated with the particular leading search query, N2(n) represents a set of leading search queries directly related with the leading search queries of N1(n) excluding any leading search queries of N1(n), α represents a first weighting coefficient, and β represents a second weighting coefficient. The weighting coefficients α and β can be established by the user of system 300 (FIG. 3) or by the operator of system 300 (FIG. 3), depending whether and to what extent the user or operator wants to assign different weights to the search volume of the leading search queries of N1(n) and N2(n). Meanwhile, σ can represent a function of a node pair strength score between two nodes, discussed in greater detail below with respect to visualization system 410 identifying the primary node pair(s). For example, Equation 6, as follows, provides an exemplary equation for calculating σ(x,y) where x and y represent the nodes of a particular node pair:

$$\sigma(x,y) = 3^{(node\ pair\ strength\ score(x,y) - 0.5)} \quad (6)$$

where the node pair strength score is calculated using at least one of Equations 1-3 in the manner discussed below with respect to the primary node pair(s).

In many embodiments, a query seasonality assessment can refer to an analysis of a relevance of a particular leading search query to the current time of year (i.e., the time when the primary user search query is received by intake system 409). For example, visualization system 410 can assign a seasonality score to the particular leading search query based on the context of the particular leading search query or one or more terms of the particular leading search query and the current time of year. In a specific example, visualization system 410 can assign a seasonality score of higher value when the particular leading search query includes the term "Christmas," and the current time of year is the month of December or the season of winter than when the current time of year is another month or another season.

In many embodiments, a query cost per click assessment can refer to an analysis of a cost per click of a particular leading search query. For example, visualization system 410 can calculate a cost per click score for the particular leading search query. In these or other embodiments, Equation 7, as follows, provides an exemplary equation for calculating a cost per click score of a particular leading search query:

$$\text{score}_{cpc}(n) = cpc(n) + \delta * \Sigma_{m \in N1(n)} cpc(m) + \epsilon * \Sigma_{p \in N2(n)} cpc(p), \quad (7)$$

where $\text{score}_{cpc}(n)$ represents a cost per click score of the particular leading search query, n represents the particular leading search query, cpc is cost per click as a function of a corresponding node (n, m, p, etc.), N1(n) represents a set of leading search queries directly associated with the particular leading search query, N2(n) represents a set of leading search queries directly related with the leading search queries of N1(n) excluding any leading search queries of N1(n), δ represents a first weighting coefficient, and ε represents a second weighting coefficient. The weighting coefficients δ and ε can be established by the user of system 300 (FIG. 3) or by the operator of system 300 (FIG. 3), depending whether and to what extent the user or operator wants to assign different weights to the cost per click of the leading search queries of N1(n) and N2(n).

In many embodiments, a query click through rate assessment can refer to an analysis of a click through rate of a particular leading search query. For example, visualization system 410 can calculate a click through rate score for the particular leading search query. In these or other embodiments, Equation 8, as follows, provides an exemplary equation for calculating a click through rate score of a particular leading search query:

$$\text{score}_{ctr}(n) = \text{ctr}(n) + \mu^* \Sigma_{m \in N1(n)} \text{ctr}(m) + \tau^* \Sigma_{p \in N2(n)} \text{ctr}(p), \quad (8)$$

where $\text{score}_{ctr}(n)$ represents a click through rate score of the particular leading search query, n represents the particular leading search query, ctr is click through rate as a function of a corresponding node (n, m, p, etc.), N1(n) represents a set of leading search queries directly associated with the particular leading search query, N2(n) represents a set of leading search queries directly related with the leading search queries of N1(n) excluding any leading search queries of N1(n), μ represents a first weighting coefficient, and τ represents a second weighting coefficient. The weighting coefficients μ and τ can be established by the user of system 300 (FIG. 3) or by the operator of system 300 (FIG. 3), depending whether and to what extent the user or operator wants to assign different weights to the click through rate of the leading search queries of N1(n) and N2(n).

In many embodiments, a query type assessment can refer to an analysis of a type of query of a particular leading search query (e.g., an informational search query, a navigational search query, or a transactional search query). For example, visualization system 410 can assign a query type score to the particular leading search query depending on the query type of the particular leading search query.

In many embodiments, a competitor uniform resource locator assessment can refer to an analysis of how a particular leading search query ranks with respect to one or more URLs of one or more competitors of the user of system 300 (FIG. 3). For example, visualization system 410 can assign a competitor URL score to the particular leading search query depending how the particular leading search query ranks with respect to one or more URLs of one or more competitors of the user of system 300 (FIG. 3). In many embodiments, visualization system 410 can identify the competitor(s) of the user of system 300 (FIG. 3) and/or the one or more competitor URLs of the competitor(s) by referencing the one or more user URL addresses received by intake system 409. In these or other embodiments, visualization system 410 can receive the one or more user URL addresses from intake system 409 via communication system 408.

In many embodiments, a buying cycle assessment can refer to an analysis of how a particular leading search query fits into a buying cycle. For example, visualization system 410 can assign a buying cycle score to the particular leading search query depending on how the particular leading search query fits into a buying cycle. In a specific example, a leading search query directed to "vehicles" can be scored more or less highly than a leading search query directed to "Ford F-150 pickup trucks," such as, for example, because the latter exemplary leading search query can be closer to the point of sale than the former exemplary leading search query.

In many embodiments, a keyword source assessment can refer to an analysis of a source of a particular leading query. For example, visualization system 410 can assign a source score to the particular leading search query depending on the source of the particular leading query. In a specific example, a leading search query originating from a URL overlap assessment can be scored more or less highly than leading search query originating from an auto-complete tool assessment. In another example, a leading search query originating from the Google Adwords' Keyword Planner by Google, Inc. of Mountain View, Calif., United States can be scored more or less highly than a leading search query originating from the Bing Ads Keyword Planner by Microsoft Corporation of Redmond, Wash., United States of America, or vice versa.

Meanwhile, Equation 9, as follows, provides an exemplary equation for calculating a query score of a particular leading score by performing both (a) a root node relationship assessment and (b) a parent node relationship assessment:

$$R_{root/parent}(n) = \{(\Pi_R * R_{root}(n) + (100 - \Pi_R))/100\} * \{(\Pi_P * R_{parent}(n) + (100 - \Pi_P))/100\} \quad (9)$$

where $R_{root/parent}(n)$ represents a query score of the particular leading search query, $R_{root}(n)$ represents a root-node strength score of the particular leading search query calculated by using Equations 1-3, as applicable, $R_{parent}(n)$ represents a parent-node strength score of the particular leading search query calculated by using Equations 1-3, as applicable, $\Pi_R$ represents a first weighting coefficient, and $\Pi_P$ represents a second weighting coefficient. The weighting coefficients $\Pi_R$ and $\Pi_P$ can be established by the user of system 300 (FIG. 3) or by the operator of system 300 (FIG. 3), depending whether and to what extent the user or operator wants to assign different weights to the root-node strength score of the particular leading search query and the parent-node strength score of the particular leading search query.

Further, Equation 10, as follows, provides an exemplary equation for calculating a query score of a particular leading score by performing (a) a root node relationship assessment, (b) a parent node relationship assessment, and (c) a query search volume assessment:

$$R_{root/parent/sv}(n) = (\text{score}_{sv}(n) + 150) * (\Pi_R + 1)^{R_{root}(n)} * (\Pi_P + 1)^{R_{parent}(n)} \quad (10)$$

where $R_{root/parent/sv}(n)$ represents a query score of the particular leading search query, $\text{score}_{sv}(n)$ represents a search volume score of the particular leading search query calculated by using Equation 4 or Equation 5, $R_{root}(n)$ represents a root-node strength score of the particular leading search query calculated by using Equations 1-3, as applicable, $R_{parent}(n)$ represents a parent-node strength score of the particular leading search query calculated by using Equations 1-3, as applicable, $\Pi_R$ represents a first weighting coefficient, and $\Pi_P$ represents a second weighting coefficient. The weighting coefficients $\Pi_R$ and $\Pi_P$ can be established by the user of system 300 (FIG. 3) or by the operator of system 300 (FIG. 3), depending whether and to what extent the user or operator wants to assign different weights to the root-node strength score of the particular leading search query and the parent-node strength score of the particular leading search query.

In other embodiments, Equation 9 or Equation 10 could be modified with different scoring functions and/or different weighting coefficients to be implemented with other node architecture assessment(s) and/or other node quality assessment(s) to calculate the query scores of the multiple leading search queries. For example, in some embodiments, Equation 10 can be modified to replace $score_{sv}(n)$ with $score_{cpc}(n)$ or $score_{ctr}(n)$.

In some embodiments, when the one or more first filtered search queries comprise multiple first filtered search queries, visualization system 410 can identify the one or more third filtered search queries. In these or other embodiments, visualization system 410 can identify the one or more third filtered search queries based on a connectedness assessment of the multiple first filtered search queries. More details on the manner of implementing the connectedness assessment are provide below, after first providing background on node pairing for context. In various embodiments, depending on the results of the connectedness assessment, the one or more third filtered search queries can consist of the multiple first filtered search queries (e.g., when no disconnected nodes of simulated multiple nodes are identified by the connectedness assessment) or the one or more third filtered search queries can comprise a sub-set of the multiple first filtered search queries (e.g., when one or more disconnected nodes of simulated multiple nodes are identified by the connectedness assessment).

Accordingly, in many embodiments, such as, for example, when visualization system 410 operates to identify the one or more third filtered search queries, the one or more primary filtered search queries can comprise or consist of the one or more third filtered search queries. Further, the one or more third filtered search queries can comprise or consist of one or more or, in some embodiments, all of the first filtered search queries. Further still, the one or more secondary filtered search queries can comprise the one or more second filtered search queries, and one or more or, in some embodiments, none of the first filtered search queries.

Meanwhile, in other embodiments, when the visualization system 410 does not operate to identify the one or more third filtered search queries, the one or more primary filtered search queries can comprise or consist of the one or more first filtered search queries. Further, the one or more secondary filtered search queries can comprise or consist of the one or more second filtered search queries.

Further, in still other embodiments, when intake system 409 receives the one or more secondary user search queries, visualization system 410 can cluster together (a) the one or more first filtered search queries or the one or more third search queries (as applicable), and (b) the one or more secondary user search queries. Accordingly, in these embodiments, the one or more primary filtered search queries can comprise or consist of (a) the one or more first filtered search queries or the one or more third filtered search queries (as applicable) and (b) the one or more secondary user search queries. Implementing intake system 409 to receive the one or more secondary user search queries and visualization system 410 to include the secondary user search queries as part of the primary filtered search queries can permit the visualization(s) constructed by visualization system 410 to cover search queries that the user of system 300 (FIG. 3) believes are related to the topic associated with the primary user search query but that may not necessarily satisfy the threshold query score.

In many embodiments, the one or more primary filtered search queries identified by visualization system 410 can be associated with the one or more second nodes of the multiple nodes of the visualization constructed by visualization system 410. Accordingly, visualization system 410 can identify (e.g., determine) the multiple nodes of the visualization(s) constructed by visualization system 410. That is, visualization system 410 can identify the multiple nodes to comprise or consist of the primary user search query (i.e., the first node of the multiple nodes) and the one or more primary filtered search queries (i.e., the one or more second nodes of the multiple nodes). By limiting the second node(s) of the multiple nodes of the visualization(s) constructed by visualization system 410 to be associated with the one or more primary filtered search queried identified by visualization system 410, the second node(s) can represent one or more topic(s) that are most materially related to the topic associated with the primary user search query.

In many embodiments, visualization system 410 can be operable to identify one or more primary node pairs of the multiple nodes. As used herein, a node pair can refer to a pair of nodes of the multiple nodes. In some embodiments, visualization system 410 can identify the primary node pair(s) while or after identifying the multiple nodes. As discussed above, the edge connector(s) of the visualization(s) (e.g., the spoke-hub graphical visualization) constructed by visualization system 410 can associate (e.g., connect) the primary node pair(s). For example, for purposes of the spoke-hub graphical visualization, the edge connector(s) can be illustrated as spokes connecting the relevant node primary node pair(s) of the multiple nodes. Accordingly, in these or other embodiments, the edge connector(s) can help the user of system 300 (FIG. 3) to understand how various nodes of the multiple nodes overlap and/or which nodes of the multiple nodes are most closely related.

In these or other embodiments, visualization system 410 can identify one or more first node pairs and one or more second node pairs of all node pairs of the multiple nodes. For example, visualization system 410 can separate all node pairs of the multiple nodes into a first group of the first node pair(s) and a second group of the second node pair(s). In these or other embodiments, any first node pair(s) are not included in (e.g., are exclusive of) any secondary node pair(s), and vice versa.

In many embodiments, to identify the first node pair(s) and the second node pair(s) of all node pairs of the multiple nodes, visualization system 410 can assign node pair strength scores to all node pairs of the multiple nodes. In some embodiments, visualization system 410 can assign the node pair strength scores to all node pairs of the multiple nodes in a similar way to how visualization system 410 assigns the query scores to the leading search queries.

For example, in these or other embodiments, visualization system 410 can assign node pair strength scores to (e.g., calculate node pair strength scores for) all node pairs of the multiple nodes based on one or more node pair strength assessments. Exemplary node pair strength assessment(s) can comprise (a) a uniform resource locator overlap assessment (Equation 1), (b) a word2vec assessment (Equation 2), and/or (c) a keyword source assessment. In some embodiments, visualization system 410 can perform (a) the uniform resource locator overlap assessment (Equation 1), (b) the word2vec assessment (Equation 2), and/or (c) the keyword source assessment for purposes of conducting the node pair strength assessment(s) similarly or identically to the manner of performing (a) the uniform resource locator overlap assessment (Equation 1), (b) the word2vec assessment (Equation 2), and/or (c) the keyword source assessment for purposes of identifying the multiple leading search queries and/or the one or more primary filtered search queries, as applicable.

Further, visualization system 410 can identify the first node pair(s) as including any node pair or pairs of the all node pairs of the multiple nodes that satisfy a threshold node pair strength score. Meanwhile, the second node pair(s) can include any node pair or pairs of the all node pairs of the multiple nodes that do not satisfy the threshold node pair strength score. The threshold node pair strength score can be established by the user of system 300 (FIG. 3) or by the operator of system 300 (FIG. 3). The first node pair(s) can comprise the primary node pair(s). In further embodiments, the first node pair(s) can consist of the primary node pair(s), such as, for example, where visualization system 410 does not pare down (e.g., narrow) the first node pair(s), as described below.

In some embodiments, when the first node pair(s) comprise multiple first node pairs, visualization system 410 can pare down (e.g., narrow) the multiple first node pairs to one or more third node pairs. For example, in these or other embodiments, visualization system 410 can pare down the multiple first node pairs to one or more third node pairs based on (a) a triangle reduction assessment and/or (b) a planarity assessment. In these or other embodiments, the third node pair(s) can comprise or consist of the primary node pair(s). In some embodiments, the third node pair(s) can comprise the first node pair(s), such as, for example, when no node pairs are removed from the first node pair(s) as a result of performing (a) the triangle reduction assessment and/or (b) the planarity assessment, as described below.

In many embodiments, visualization system 410 can perform a triangle reduction assessment by reviewing the multiple nodes and the first node pairs identified by visualization system 410 to confirm that none of the multiple nodes and the first node pairs forms a triangle. To the extent the multiple nodes and the first node pairs do form a triangle, visualization system 410 can remove the first node pair of the first node pairs forming the triangle having the lowest node pair strength score from the first node pairs to form the third node pairs.

In many embodiments, visualization system 410 can perform a planarity assessment by reviewing the multiple nodes and the first node pairs identified by visualization system 410 to confirm that all of the nodes and the first node pairs can be arranged in a planar format. To the extent the multiple nodes and the first node pairs cannot be arranged in a planar format, visualization system 410 can remove any first node pairs of the first node pairs preventing the multiple nodes and the first node pairs from being arranged in a planar format from the first node pairs to form the third node pairs.

In some embodiments, as discussed above with respect to visualization system 410 identifying the one or more third filtered search queries, visualization system 410 can perform a connectedness assessment of the multiple first filtered search queries identified by visualization system 410. For example, to perform the connectedness assessment, visualization system 410 can simulate that the primary filtered search queries comprise the multiple first filtered search queries and that the multiple nodes correspond to the multiple first filtered search queries, and further can simulate identifying the one or more first node pairs, the one or more second node pairs, and if applicable, the one or more third node pairs of the simulated multiple nodes. Then, visualization system 410 can review the simulated multiple nodes and the simulated first node pairs or third node pairs (as applicable) identified by visualization system 410 to confirm that each node of the simulated multiple nodes forms at least one pair of the first node pairs or the third node pairs (as applicable) such that no nodes of the simulated multiple nodes are disconnected from the other nodes of the simulated multiple nodes. To the extent any nodes of the simulated multiple nodes are disconnected from the other nodes of the simulated multiple nodes, visualization system 410 can remove from the multiple first filtered search queries any first filtered search queries of the multiple first filtered search queries that correspond to the disconnected node(s) to identify the one or more third filtered search queries. Meanwhile, to the extent no nodes of the simulated multiple nodes are disconnected from the other nodes of the simulated multiple nodes, the one or more third filtered search queries can comprise the multiple first filtered search queries.

In many embodiments, visualization system 410 can pare down (e.g., narrow) the multiple first node pairs to the third node pair(s) to permit the visualization(s) constructed by visualization system 410 to be less convoluted so that the user of system 300 (FIG. 3) can more easily understand the visualization(s). In these or other embodiments, visualization system 410 can pare down (e.g., narrow) the multiple first node pairs to the third node pair(s) to prevent the visualization(s) constructed by visualization system 410 from being circuitous so that the user of system 300 (FIG. 3) can identify clear relationship paths along the multiple nodes of the visualization(s). Further, visualization system 410 can identify the one or more third filtered search queries so that the user of system 300 (FIG. 3) can identify relationship paths for each of the multiple nodes of the visualization(s).

In many embodiments, visualization system 410 can associate each particular node of the multiple nodes of the visualization(s) constructed by visualization system 410 with one or more node properties relating to that particular node. Exemplary node properties can comprise (i) query intention data, (ii) query search volume data, (iii) query seasonality data, (iv) query cost per click data, (v) query click through rate data, (vi) query type data, (vii) competitor URL data, and/or (viii) buying cycle data.

For example, in many embodiments, the query search volume data can comprise a search volume value of the search query associated with a particular node; the query cost per click data can comprise a cost per click value of the search query associated with a particular node; and the query click through rate data can comprise a click through rate value of the search query associated with a particular node. Meanwhile, the query seasonality data can comprise a search volume value, a cost per click value, and/or a click through rate value of the search query associated with that particular node for each month and/or for each season of the year.

Further, in many embodiments, the query intention data can comprise a user intention of the search query associated with a particular node. Exemplary user intention(s) can comprise a buyer intention, an informed intention, an amusement intention, etc. In these or other embodiments, the query type data can comprise a query type of the search query associated with a particular node. Exemplary query type(s) can comprise an informational search query type, a navigational search query type, or a transactional search query type. In these or other embodiments, the buying cycle data can comprise a buying cycle position of the search query associated with a particular node.

Further still, in some embodiments, the competitor URL data can comprise one or more competitor URLs of one or more competitors of the user of system 300 (FIG. 3) that rank most highly with respect to the search query associated with a particular node. In many embodiments, visualization system 410 can identify the competitor(s) of the user of system 300 (FIG. 3) and/or the one or more competitor URLs of the competitor(s) by referencing the one or more user URL addresses received by intake system 409. In these or other embodiments, visualization system 410 can receive the one or more user URL addresses from intake system 409 via communication system 408. In further embodiments, the competitor URL data can further comprise a quantity of keywords, a search volume value, or an estimate of user traffic associated with the one or more URLs of the competitor(s).

Visualization system 410 can be operable to visually coordinate nodes of the multiple nodes with one or more common visual identifiers based on the one or more node properties of the multiple nodes. For example, in many embodiments, visualization system 410 can visually coordinate nodes of the multiple nodes sharing one or more of the same or similar node properties of the one or more node properties in common. Visualization system 410 can visually coordinate nodes of the multiple nodes with the common visual identifier(s) so that the user of system 300 (FIG. 3) can understand and appreciate one or more relationships that the topics associated with the multiple nodes have with each other.

Although, in some embodiments, visualization system 410 can visually coordinate nodes of the multiple nodes with any suitable common visual identifier(s), in many embodiments, the common visual identifier(s) can comprise one or more colors or one or more patterns. By implementing multiple colors and/or patterns for the common visual identifier(s), visualization system 410 can coordinate multiple groups of nodes of the multiple nodes simultaneously and/or can create associations of certain color(s) and/or pattern(s) with specific node properties. To provide more options for visual coordination, the color(s) implemented can vary by color type (e.g., red, blue, green, etc.) and/or by color shade.

In many examples, when the one or more node properties comprise one or more qualitative node values (e.g., query intention data, query type data, buying cycle data, etc.), visualization system 410 can visually coordinate any nodes of the multiple nodes associated with search queries having same or similar qualitative node. For example, when the one or more node properties comprise query intention data, visualization system 410 can visually coordinate any nodes of the multiple nodes associated with search queries having a buyer intention, any nodes of the multiple nodes associated with search queries having an informed intention, and any nodes associated with search queries having an amusement intention. Further, in these or other examples, when the one or more node properties comprise one or more quantitative node values (e.g., query search volume data, query cost per click data, query click through rate data, etc.), visualization system 410 can coordinate any nodes of the multiple nodes associated with search queries having quantitative node values falling within certain same or similar ranges. For example, when the one or more node properties comprise query search volume data, visualization system 410 can coordinate any nodes of the multiple nodes associated with search queries having query search volume values from 0 to 500 searches, any nodes of the multiple nodes associated with search queries having query search volume values from 501 to 1000 searches, etc.

In many embodiments, visualization system 410 can visually coordinate nodes of the multiple nodes with the common visual identifier(s) based on the node property selection(s) received by intake system 409. For example, in these embodiments, the user of system 300 (FIG. 3) can select which node properties of the one or more node properties of the multiple nodes visualization system 300 (FIG. 3) visually coordinates with the common visual identifier(s). Accordingly, the user of system 300 (FIG. 3) can select the node properties of the one or more node properties of the multiple nodes that are most significant to the user. In other embodiments, visualization system 410 can visually coordinate nodes of the multiple nodes with the common visual identifier(s) without consideration for the preferences of the user of system 300 (FIG. 3).

In many embodiments, although visualization system 410 is primarily discussed with respect to the construction of a spoke-hub graphical visualization, in these or other embodiments, visualization system 410 can additionally or alternatively construct a first visualization (e.g., a first tabular visualization) and/or a second visualization (e.g., a second tabular visualization). For example, the first tabular visualization can comprise a first table including the multiple nodes, and the second tabular visualization can comprise a second table including the edge connector(s). In many embodiments, when visualization system 410 constructs tabular visualization(s), one or more node properties of the node properties can be included as part of the first visualization and/or the second visualization and presented (e.g., displayed) to the user of system 300 (FIG. 3) by presentation system 411, as discussed below.

Presentation System 411

Presentation system 411 can be operable to present (e.g., display) the visualization(s) constructed by visualization system 410 to the user of system 300 (FIG. 3). In implementation, presentation system 411 can present (e.g., display) the visualization(s) constructed by visualization system 410 to the user of system 300 (FIG. 3) at an electronic display, such as, for example, an electronic display of user computer system 304 (FIG. 3). In these or other embodiments, presentation system 411 can provide the visualization(s) constructed by visualization system 410 to user computer system 304 (FIG. 3) via communication system 408, as described above.

In many embodiments, presentation system 411 can permit the user of system 300 (FIG. 3) to select particular nodes of the multiple nodes (i.e., the node selection(s) received by intake system 409), and in response to receiving the node selection(s) at intake system 409, can present (e.g., display) the one or more node properties of the particular nodes. The node selection(s) can be received by intake system 409 and/or presented to the user of system 300 (FIG. 3) by presentation system 411 in serial and/or in parallel. In these or other embodiments, presentation system 411 can receive the node selection(s) from intake system 409 via communication system 408.

In further embodiments, presentation system 411 can permit the user of system 300 (FIG. 3) to request visualization system 410 to expand the current visualization(s) constructed by visualization system 410 and/or to construct one or more new visualization(s) (i.e., the node expansion request(s) received by intake system 409). In these or other embodiments, the user of system 300 (FIG. 3) can identify a particular node, and visualization system 410 can identify that particular node as a new primary user search request. Then, visualization system 410 can build upon the existing visualization(s) being presented to the user of system 300 (FIG. 3) by presentation system 411 and/or can construct new visualization(s) for presentation (e.g., display) by presentation system 411. In these or other embodiments, presentation system 410 and/or visualization system 411 can receive the node expansion request(s) from intake system 409 via communication system 408, directly or indirectly through the other. Advantageously, by permitting the user of system 300 (FIG. 3) to request visualization system 410 to expand the current visualization(s) constructed by visualization system 410 and/or to construct one or more new visualization(s), the user of system 300 (FIG. 3) can be able to explore the topics relating to the topic associated with the primary user search query, thereby providing the user with a better understanding of the original topic and the related topics.

Figure 6:
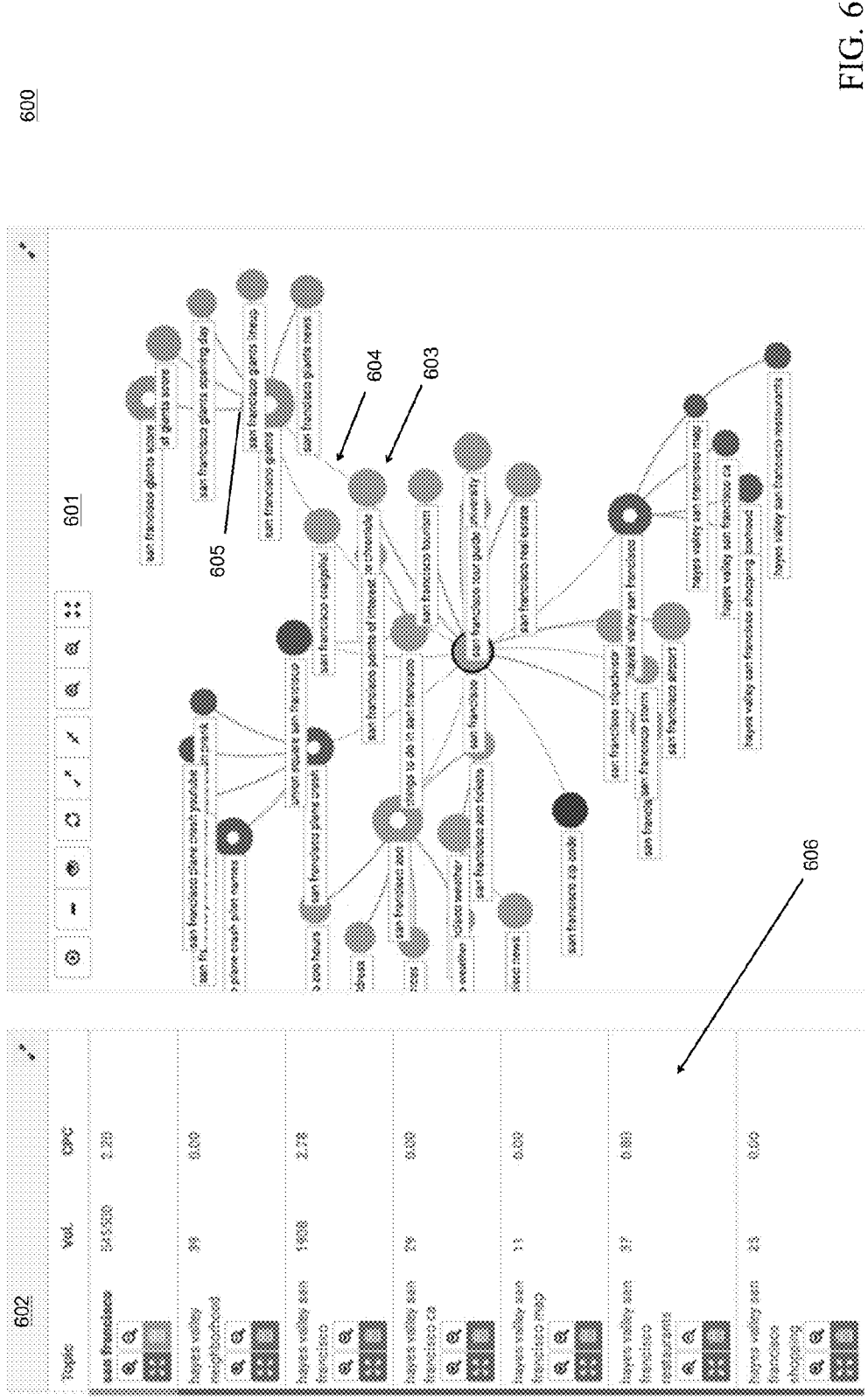
FIG. 6 illustrates exemplary visualizations presented by a presentation system and constructed by a visualization system of a system, according to an embodiment.

Turning ahead in the drawings, FIG. 6 illustrates exemplary visualizations 600 presented by a presentation system and constructed by a visualization system of a system, according to an embodiment. The system can be similar or identical to system 300 (FIG. 3); the visualization system can be similar or identical to visualization system 410 (FIG. 4); and/or the presentation system can be similar or identical to presentation system 411 (FIG. 4). Accordingly, visualization(s) 600 can be similar or identical to the visualization(s) described above with respect to system 300 (FIG. 3).

For example, presentation(s) 600 can comprise first visualization 601 and second visualization 602. First visualization 601 can be similar or identical to the spoke-hub graphical visualization described above with respect to system 300 (FIG. 3). Accordingly, first visualization 601 can comprise multiple nodes 603 and one or more edge connectors 604. Further, multiple nodes 603 can be similar or identical to the multiple nodes described above with respect to system 300 (FIG. 3), and edge connector(s) 604 can be similar or identical to the edge connector(s) described above with respect to system 300 (FIG. 3). Multiple nodes 603 can comprise selected node 605. Selected node 605 can be similar or identical to a selected node as described above with respect to system 300 (FIG. 3).

Meanwhile, second visualization system 602 can be similar or identical to the tabular visualizations described above with respect to system 300 (FIG. 3). Accordingly, second visualization system 602 can comprise table entries 606 corresponding to multiple nodes 603, as partially shown at FIG. 6.

Figure 7:
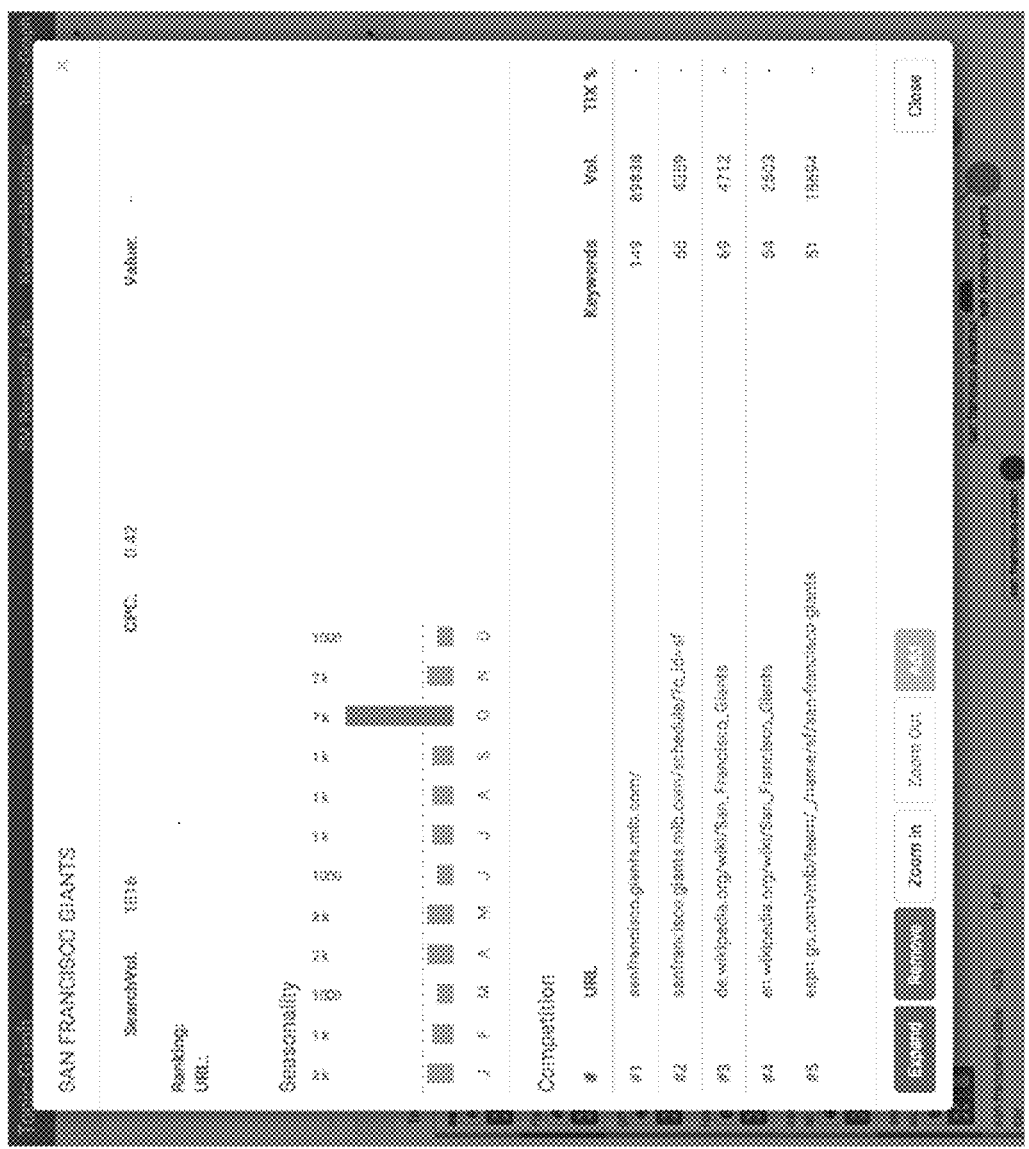
FIG. 7 illustrates an exemplary graphic user interface presenting one or more node properties of a selected node, according to the embodiment of FIG. 6

Turning ahead again in the drawings, FIG. 7 illustrates an exemplary graphic user interface 700 presenting one or more node properties of selected node 605 (FIG. 6), according to the embodiment of FIG. 6. The one or more node properties can be similar or identical to the one or more node properties described above with respect to system 300 (FIG. 3).

Figure 8:
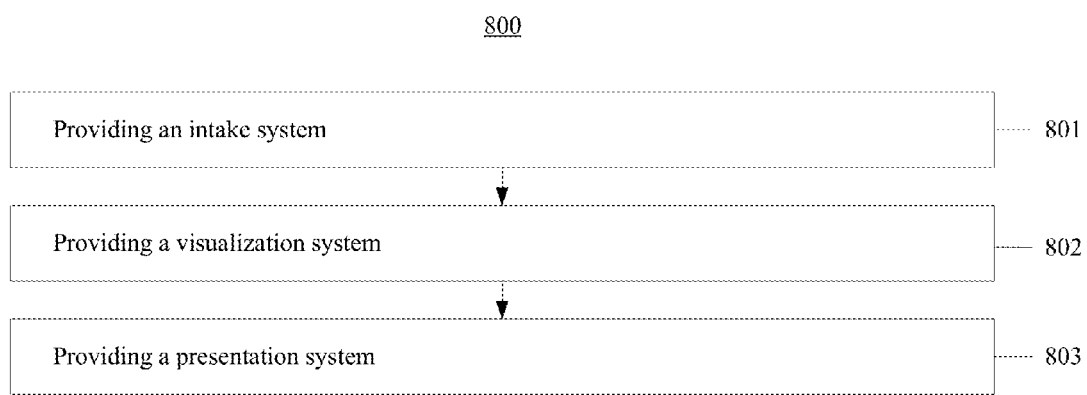
FIG. 8 illustrates a flow chart for a method, according to an embodiment.

Turning ahead in the drawings, FIG. 8 illustrates a flow chart for a method 800, according to an embodiment. In some embodiments, method 800 can comprise a method of providing a system. The system can be similar or identical to system 300 (FIG. 3).

Method 800 is merely exemplary and is not limited to the embodiments presented herein. Method 800 can be employed in many different embodiments or examples not specifically depicted or described herein. In some embodiments, the activities of method 800 can be performed in the order presented. In other embodiments, the activities of method 800 can be performed in any suitable order. In still other embodiments, one or more of the activities of method 800 can be combined or skipped.

For example, in many embodiments, method 800 can comprise activity 801 of providing an intake system. In some embodiments, the intake system can be similar or identical to intake system 409 (FIG. 4).

Further, in many embodiments, method 800 can comprise activity 802 of providing a visualization system. In some embodiments, the visualization system can be similar or identical to visualization system 410 (FIG. 4).

Further still, in many embodiments, method 800 can comprise activity 803 of providing a presentation system. In some embodiments, the presentation system can be similar or identical to presentation system 411 (FIG. 4).

Turning ahead again in the drawings, FIG. 9 illustrates a flow chart for a method 900, according to an embodiment. In some embodiments, method 900 can comprise a method of constructing one or more visualization(s). In these or other embodiments, method 900 can comprise a computer search engine optimization method. In some embodiments, part or all of method 900 can be performed by a system. The system can be similar or identical to system 300 (FIG. 3).

Method 900 is merely exemplary and is not limited to the embodiments presented herein. Method 900 can be employed in many different embodiments or examples not specifically depicted or described herein. In some embodiments, the activities of method 900 can be performed in the order presented. In other embodiments, the activities of method 900 can be performed in any suitable order. In still other embodiments, one or more of the activities of method 900 can be combined or skipped. In many embodiments, central computer system 301 (FIG. 3) can be suitable to perform method 900 and/or one or more of the activities of method 900. In these or other embodiments, one or more of the activities of method 900 can be implemented as one or more computer instructions configured to run at one or more processors and configured to be stored at one or more non-transitory memory storage devices. The processor(s) can be similar or identical to the processor(s) described above with respect to computer system 100 (FIG. 1) and/or to processor(s) 405 (FIG. 4). Further, the non-transitory memory storage device(s) can be similar or identical to the non-transitory memory storage device(s) described above with respect to computer system 100 (FIG. 1) and/or to non-transitory memory storage device(s) 407 (FIG. 4).

In many embodiments, method 900 can comprise activity 901 of receiving a primary user search query. In some embodiments, performing activity 901 can be similar or identical to receiving a primary user search query as described above with respect to system 300 (FIG. 3). In these or other embodiments, the primary user search query can be similar or identical to the primary user search query described above with respect to system 300 (FIG. 3).

In many embodiments, method 900 can comprise activity 902 of receiving one or more secondary user search queries. In some embodiments, performing activity 902 can be similar or identical to receiving one or more secondary user search queries as described above with respect to system 300 (FIG. 3). In these or other embodiments, the secondary user search query can be similar or identical to the one or more secondary user search queries described above with respect to system 300 (FIG. 3). In various embodiments, activity 902 can be omitted.

In many embodiments, method 900 can comprise activity 903 of receiving one or more user language selections. In some embodiments, performing activity 903 can be similar or identical to receiving one or more user language selections as described above with respect to system 300 (FIG. 3). In these or other embodiments, the user language selection(s) can be similar or identical to the user language selection(s) described above with respect to system 300 (FIG. 3). In various embodiments, activity 903 can be omitted.

In many embodiments, method 900 can comprise activity 904 of receiving one or more user uniform resource locator (URL) addresses. In some embodiments, performing activity 904 can be similar or identical to receiving one or more user URL addresses as described above with respect to system 300 (FIG. 3). In these or other embodiments, the one or more user URL addresses can be similar or identical to the one or more user URL addresses described above with respect to system 300 (FIG. 3). In various embodiments, activity 904 can be omitted.

Figure 10:
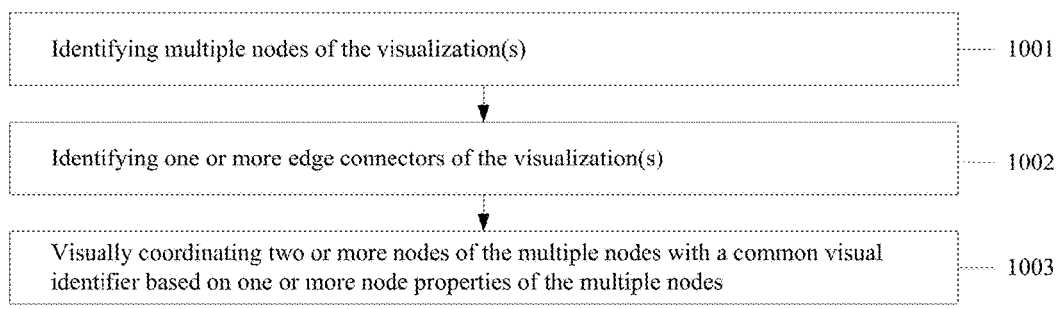
FIG. 10 illustrates an exemplary activity of constructing one or more visualizations, according to the embodiment of FIG. 9.

In many embodiments, method 900 can comprise activity 905 of constructing one or more visualizations. In some embodiments, performing activity 905 can be similar or identical to constructing the visualization(s) as described above with respect to system 300 (FIG. 3). In these or other embodiments, the visualization(s) can be similar or identical to the visualization(s) described above with respect to system 300 (FIG. 3). In various embodiments, one or more of activities 901-904 can be performed before activity 905 is performed. FIG. 10 illustrates an exemplary activity 905, according to the embodiment of FIG. 9.

Figure 11:
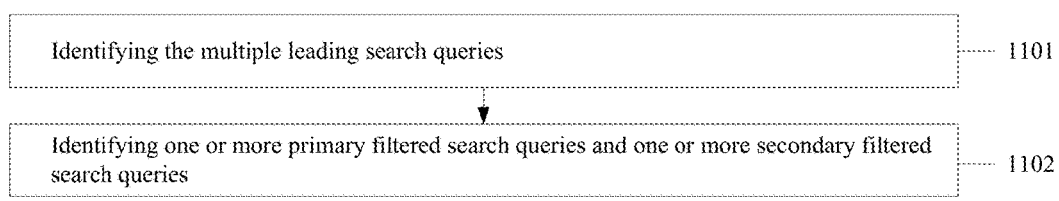
FIG. 11 illustrates an exemplary activity of identifying multiple nodes of the visualization(s), according to the embodiment of FIG. 9.

In many embodiments, activity 905 can comprise activity 1001 of identifying multiple nodes of the visualization(s). In some embodiments, performing activity 1001 can be similar or identical to identifying multiple nodes of the visualization(s) as described above with respect to system 300 (FIG. 3). In these or other embodiments, the multiple nodes can be similar or identical to the multiple nodes described above with respect to system 300 (FIG. 3). FIG. 11 illustrates an exemplary activity 1001, according to the embodiment of FIG. 9.

In many embodiments, activity 1001 can comprise activity 1101 of identifying the multiple leading search queries. In some embodiments, performing activity 1101 can be similar or identical to identifying the multiple leading search queries as described above with respect to system 300 (FIG. 3). For example, in various embodiments, activity 1101 can comprise an activity of clustering together the multiple leading search queries using (a) a uniform resource locator overlap assessment, (b) an auto-complete tool assessment, and/or (c) a keyword relation database assessment. In these or other embodiments, the multiple leading search queries can be similar or identical to the multiple leading search queries described above with respect to system 300 (FIG. 3).

Figure 12:
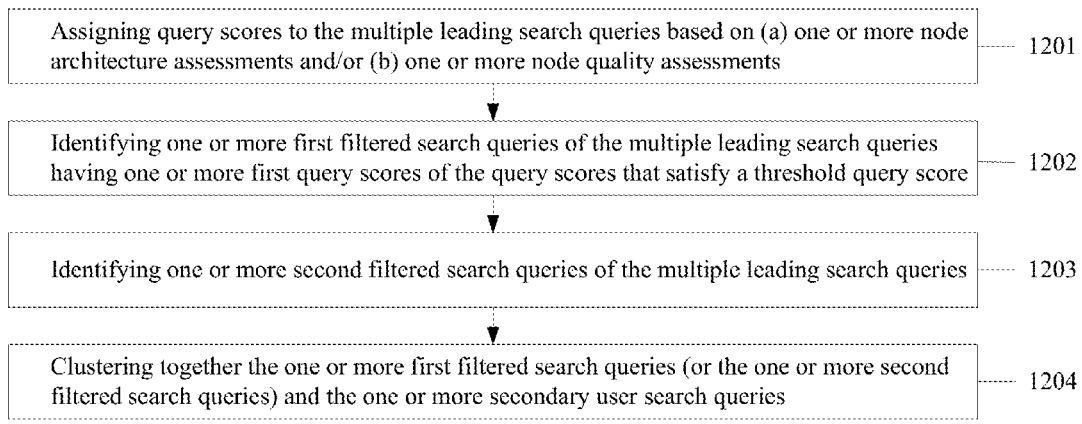
FIG. 12 illustrates an exemplary activity of identifying one or more primary filtered search queries and one or more secondary filtered search queries, according to the embodiment of FIG. 9.

Further, in many embodiments, activity 1001 can comprise activity 1102 of identifying one or more primary filtered search queries and one or more secondary filtered search queries. In some embodiments, performing activity 1102 can be similar or identical to identifying one or more primary filtered search queries and one or more secondary filtered search queries as described above with respect to system 300 (FIG. 3). In these or other embodiments, the one or more primary filtered search queries can be similar or identical to the one or more primary filtered search queries described above with respect to system 300 (FIG. 3); and/or the one or more secondary filtered search queries can be similar or identical to the one or more secondary filtered search queries described above with respect to system 300 (FIG. 3). FIG. 12 illustrates an exemplary activity 1102, according to the embodiment of FIG. 9.

In many embodiments, activity 1102 can comprise activity 1201 of assigning query scores to the multiple leading search queries based on (a) one or more node architecture assessments and/or (b) one or more node quality assessments. In some embodiments, performing activity 1201 can be similar or identical to assigning query scores to the multiple leading search queries based on (a) one or more node architecture assessments and/or (b) one or more node quality assessments as described above with respect to system 300 (FIG. 3). In these or other embodiments, the node architecture assessment(s) can be similar or identical to the node architecture assessment(s) described above with respect to system 300 (FIG. 3); the node quality assessment(s) can be similar or identical to the node quality assessment(s) described above with respect to system 300 (FIG. 3); and/or the query score(s) can be similar or identical to the query score(s) described above with respect to system 300 (FIG. 3).

In many embodiments, activity 1102 can comprise activity 1202 of identifying one or more first filtered search queries of the multiple leading search queries having one or more first query scores of the query scores that satisfy a threshold query score. In some embodiments, performing activity 1202 can be similar or identical to identifying one or more first filtered search queries of the multiple leading search queries having one or more first query scores of the query scores that satisfy a threshold query score as described above with respect to system 300 (FIG. 3). In these or other embodiments, the one or more first filtered search queries can be similar or identical to the one or more first filtered search queries described above with respect to system 300 (FIG. 3); and/or the threshold query score can be similar or identical to the threshold query score described above with respect to system 300 (FIG. 3).

In many embodiments, when the one or more first filtered search queries comprise multiple first filtered search queries, activity 1102 can comprise activity 1203 of identifying one or more second filtered search queries of the multiple leading search queries. In some embodiments, performing activity 1203 can be similar or identical to identifying one or more third filtered search queries of the multiple leading search queries as described above with respect to system 300 (FIG. 3). In these or other embodiments, the one or more second filtered search queries can be similar or identical to the one or more third filtered search queries described above with respect to system 300 (FIG. 3). For example, in these or other embodiments, activity 1102 can comprise identifying one or more second filtered search queries of the multiple leading search queries based on a connectedness assessment. Further, the connectedness assessment can be similar or identical to the connectedness assessment described above with respect to system 300 (FIG. 3). In various embodiments, activity 1203 can be omitted.

In many embodiments, activity 1102 can comprise activity 1204 of clustering together the one or more first filtered search queries (or the one or more second filtered search queries) and the one or more secondary user search queries. In some embodiments, performing activity 1204 can be similar or identical to clustering together (a) the one or more first user search queries or the one or more third user search queries and (b) the one or more secondary user search queries as described above with respect to system 300 (FIG. 3). In various embodiments, activity 1204 can be omitted, such as, for example, when activity 902 is omitted.

Figure 13:
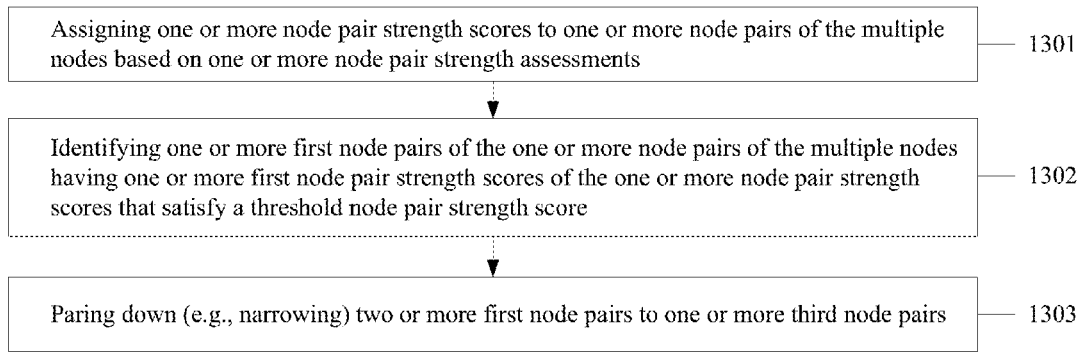
FIG. 13 illustrates an exemplary activity of identifying one or more edge connectors of the visualization(s), according to the embodiment of FIG. 9.

Turning now back to FIG. 10, in many embodiments, activity 905 can comprise activity 1002 of identifying one or more edge connectors of the visualization(s). In some embodiments, performing activity 1002 can be similar or identical to identifying one or more edge connectors of the visualization(s) as described above with respect to system 300 (FIG. 3). In these or other embodiments, the edge connector(s) can be similar or identical to the edge connector(s) described above with respect to system 300 (FIG. 3). FIG. 13 illustrates an exemplary activity 905, according to the embodiment of FIG. 9.

In many embodiments, activity 1002 can comprise activity 1301 of assigning one or more node pair strength scores to one or more node pairs of the multiple nodes based on one or more node pair strength assessments. In some embodiments, performing activity 1301 can be similar or identical to assigning one or more node pair strength scores to one or more node pairs of the multiple nodes based on one or more node pair strength assessments as described above with respect to system 300 (FIG. 3). In these or other embodiments, the node pair strength score(s) can be similar or identical to the node pair strength score(s) described above with respect to system 300 (FIG. 3); the node pair(s) can be similar or identical to the node pair(s) described above with respect to system 300 (FIG. 3); and/or the node pair strength assessment(s) can be similar or identical to the node pair strength assessment(s) described above with respect to system 300 (FIG. 3).

In some embodiments, activity 1002 can comprise activity 1302 of identifying one or more first node pairs of the one or more node pairs of the multiple nodes having one or more first node pair strength scores of the one or more node pair strength scores that satisfy a threshold node pair strength score. In some embodiments, performing activity 1301 can be similar or identical to identifying one or more first node pairs of the one or more node pairs of the multiple nodes having one or more first node pair strength scores of the one or more node pair strength scores that satisfy a threshold node pair strength score as described above with respect to system 300 (FIG. 3). In these or other embodiments, the first node pair(s) can be similar or identical to the first node pair(s) described above with respect to system 300 (FIG. 3); the first node pair strength score(s) can be similar or identical to the first node pair strength score(s) described above with respect to system 300 (FIG. 3); and/or the threshold node pair strength score can be similar or identical to the threshold node pair strength score described above with respect to system 300 (FIG. 3).

In some embodiments, activity 1002 can comprise activity 1303 of paring down (e.g., narrowing) two or more first node pairs to one or more third node pairs. In some embodiments, performing activity 1303 can be similar or identical to paring down (e.g., narrowing) two or more first node pairs to one or more third node pairs as described above with respect to system 300 (FIG. 3). For example, in various embodiments, activity 1303 can comprise an activity of paring down (e.g., narrowing) the two or more first node pairs to the one or more third node pairs based on (a) a triangle reduction assessment and/or (b) a planarity assessment. In these or other embodiments, the third node pair(s) can be similar or identical to the third node pair(s) described above with respect to system 300 (FIG. 3). Meanwhile, the triangle reduction assessment can be similar or identical to the triangle reduction assessment described above with respect to system 300 (FIG. 3); and/or the planarity assessment can be similar or identical to the planarity assessment described above with respect to system 300 (FIG. 3). In various embodiments, activity 1303 can be omitted.

Turning again back to FIG. 10, in many embodiments, activity 905 can comprise activity 1003 of visually coordinating two or more nodes of the multiple nodes with a common visual identifier based on one or more node properties of the multiple nodes. In some embodiments, performing activity 1003 can be similar or identical to visually coordinating two or more nodes of the multiple nodes with a common visual identifier based on one or more node properties of the multiple nodes as described above with respect to system 300 (FIG. 3). In these or other embodiments, the common visual identifier can be similar or identical to the common visual identifier described above with respect to system 300 (FIG. 3); and/or the one or more node properties can be similar or identical to the one or more node properties described above with respect to system 300 (FIG. 3). In various embodiments, activity 1003 can be omitted.

In many embodiments, method 900 can comprise activity 906 of presenting the visualization(s) at an electronic display. In some embodiments, performing activity 906 can be similar or identical to presenting the visualization(s) at an electronic display as described above with respect to system 300 (FIG. 3). In these or other embodiments, the electronic display can be similar or identical to the electronic display described above with respect to system 300 (FIG. 3). In various embodiments, activity 906 can be performed after activity 905.

In many embodiments, method 900 can comprise activity 907 of receiving one or more node property selections of the one or more node properties of the multiple nodes. In some embodiments, performing activity 907 can be similar or identical to receiving one or more node property selections of the one or more node properties of the multiple nodes as described above with respect to system 300 (FIG. 3). In these or other embodiments, the node property selection(s) can be similar or identical to the node property selection(s) described above with respect to system 300 (FIG. 3). In various embodiments, activity 907 can be performed after activity 906. In other embodiments, activity 907 can be omitted.

In many embodiments, method 900 can comprise activity 908 of receiving a node selection corresponding to a selected node of the multiple nodes. In some embodiments, performing activity 907 can be similar or identical to receiving a node selection corresponding to a selected node of the multiple nodes as described above with respect to system 300 (FIG. 3). In these or other embodiments, the node selection(s) can be similar or identical to the node selection(s) described above with respect to system 300 (FIG. 3). In various embodiments, activity 908 can be performed after activity 907. In other embodiments, activity 908 can be omitted.

In many embodiments, method 900 can comprise activity 909 of presenting one or more node properties of the selected node of the multiple nodes at the electronic display. In some embodiments, performing activity 909 can be similar or identical to presenting one or more node properties of the selected node of the multiple nodes at the electronic display as described above with respect to system 300 (FIG. 3). In these or other embodiments, the node selection(s) can be similar or identical to the node selection(s) described above with respect to system 300 (FIG. 3). In various embodiments, activity 908 can be performed after activity 907. In other embodiments, activity 909 can be omitted.

In many embodiments, method 900 can comprise activity 910 of receiving one or more node expansion requests. In some embodiments, performing activity 910 can be similar or identical to presenting one or more node properties of the selected node of the multiple nodes at the electronic display as described above with respect to system 300 (FIG. 3). In these or other embodiments, the node expansion request(s) can be similar or identical to the node expansion request(s) described above with respect to system 300 (FIG. 3).

Having provided the above description of system 300 (FIG. 3), method 800 (FIG. 8), and method 900 (FIG. 9), other embodiments of systems and methods are also provided herein. Some embodiments can include systems similar to system 300 (FIG. 3), methods similar to method 800

(FIG. 8), and/or methods similar to method 900 (FIG. 9). Some of these systems and methods can be centric to a user computer system and/or a user (e.g., operating the user computer system). The user computer system can be similar or identical to user computer system 304 (FIG. 3) and/or the user can be similar or identical to the user described above with respect to system 300 (FIG. 3).

Although the invention has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-13 may be modified, and that the foregoing discussion of certain of these embodiments does not necessarily represent a complete description of all possible embodiments. For example, one or more of the activities of method 800 (FIG. 8) or method 900 (FIG. 9) or one or more of the other methods described herein may include different activities and be performed by many different modules and/or in many different orders. As another example, the systems within central computer system 301 and/or user computer system(s) 303 in FIG. 3 can be interchanged or otherwise modified.

Generally, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
an input device;
an output device;
one or more processors; and
one or more non-transitory memory storage devices storing computer instructions configured to run on the one or more processors and perform acts comprising:
receiving a primary user search query;
constructing a graphical visualization comprising multiple nodes and one or more edge connectors connecting one or more primary node pairs of the multiple nodes, the multiple nodes comprising a first node associated with the primary user search query and one or more second nodes associated with one or more primary filtered search queries of multiple leading search queries related to the primary user search query; and
presenting the graphical visualization at an electronic display;
wherein:
constructing the graphical visualization comprising the multiple nodes and the one or more edge connectors connecting the one or more primary node pairs of the multiple nodes comprises:
identifying the multiple leading search queries; and
identifying the one or more primary filtered search queries and one or more secondary filtered search queries;
any primary filtered search query of the one or more primary filtered search queries is not included in the one or more secondary filtered search queries;
the multiple leading search queries comprise the one or more primary filtered search queries and the one or more secondary filtered search queries; and
identifying the multiple leading search queries comprises:
clustering together the multiple leading search queries using at least one of: (a) a uniform resource locator overlap assessment, (b) an auto-complete tool assessment, or (c) a keyword relation database assessment;
identifying the one or more primary filtered search queries and the one or more secondary filtered search queries comprises:
assigning query scores to the multiple leading search queries based on at least one of: (a) one or more node architecture assessments or (b) one or more node quality assessments; and
identifying one or more first filtered search queries of the multiple leading search queries having one or more first query scores of the query scores that satisfy a threshold query score, the first query scores being based on the at least one of: (a) the one or more node architecture assessments, or (b) the one or more node quality assessments;
constructing the graphical visualization comprising the multiple nodes and the one or more edge connectors connecting the one or more primary node pairs of the multiple nodes further comprises:
assigning one or more node pair strength scores to one or more node pairs of the multiple nodes based on one or more node pair strength assessments; and
identifying one or more first node pairs of the one or more node pairs of the multiple nodes having one or more first node pair strength scores of the one or more node pair strength scores that satisfy a threshold node pair strength score, the one or more first node pairs comprising the one or more primary node pairs;
the one or more first node pairs comprise two or more first node pairs;
constructing the graphical visualization comprising the multiple nodes and the one or more edge connectors connecting the one or more primary node pairs of the multiple nodes further comprises:
paring down the two or more first node pairs to one or more second node pairs;
the two or more first node pairs comprise the one or more second node pairs;
the one or more second node pairs consist of the one or more primary node pairs; and
the input device and the output device are configured to permit an operator of the system to manage the one or more processors and the one or more non-transitory memory storage devices.

2. A computer search engine optimization system comprising:
an input device;
an output device;
one or more processors; and
one or more non-transitory memory storage devices storing computer instructions configured to run on the one or more processors and perform acts comprising:
receiving a primary user search query;
constructing a graphical visualization comprising multiple nodes and one or more edge connectors connecting one or more primary node pairs of the multiple nodes, the multiple nodes comprising a first node associated with the primary user search query and one or more second nodes associated with one or more primary filtered search queries of multiple leading search queries related to the primary user search query; and
presenting the graphical visualization at an electronic display;
wherein:
constructing the graphical visualization comprising the multiple nodes and the one or more edge connectors connecting the one or more primary node pairs of the multiple nodes comprises:
identifying the multiple leading search queries;
identifying the one or more primary filtered search queries and one or more secondary filtered search queries;
assigning one or more node pair strength scores to one or more node pairs of the multiple nodes based on one or more node pair strength assessments; and
identifying one or more first node pairs of the one or more node pairs of the multiple nodes having one or more first node pair strength scores of the one or more node pair strength scores that satisfy a threshold node pair strength score, the one or more first node pairs comprising the one or more primary node pairs;
any primary filtered search query of the one or more primary filtered search queries is not included in the one or more secondary filtered search queries;
the multiple leading search queries comprise the one or more primary filtered search queries and the one or more secondary filtered search queries;
identifying the multiple leading search queries comprises:
clustering together the multiple leading search queries using at least one of: (a) a uniform resource locator overlap assessment, (b) an auto-complete tool assessment, or (c) a keyword relation database assessment;
the one or more first node pairs comprise two or more first node pairs;
constructing the graphical visualization comprising the multiple nodes and the one or more edge connectors connecting the one or more primary node pairs of the multiple nodes further comprises:
paring down the two or more first node pairs to one or more second node pairs;
the two or more first node pairs comprise the one or more second node pairs;
the one or more second node pairs consist of the one or more primary node pairs; and
the input device and the output device are configured to permit an operator of the computer search engine optimization system to manage the one or more processors and the one or more non-transitory memory storage devices.

3. The computer search engine optimization system of claim 2 wherein:
identifying the one or more primary filtered search queries and the one or more secondary filtered search queries comprises:
assigning query scores to the multiple leading search queries based on at least one of: (a) one or more node architecture assessments or (b) one or more node quality assessments; and
identifying one or more first filtered search queries of the multiple leading search queries having one or more first query scores of the query scores that satisfy a threshold query score, the first query scores being based on the at least one of: (a) the one or more node architecture assessments, or (b) the one or more node quality assessments.

4. A computer search engine optimization system comprising:
an input device;
an output device;
one or more processors; and
one or more non-transitory memory storage devices storing computer instructions configured to run on the one or more processors and perform acts comprising:
receiving a primary user search query;
constructing multiple visualizations comprising a first visualization of multiple nodes and a second visualization of one or more edge connectors associating one or more primary node pairs of the multiple nodes, the multiple nodes comprising a first node associated with the primary user search query and one or more second nodes associated with one or more primary filtered search queries of multiple leading search queries related to the primary user search query; and
presenting at least one of the multiple visualizations at an electronic display;
wherein:
constructing the multiple visualizations comprising the first visualization of the multiple nodes and the second visualization of the one or more edge connectors associating one or more primary node pairs of the multiple nodes comprises:
identifying the multiple leading search queries;
identifying the one or more primary filtered search queries and one or more secondary filtered search queries;
assigning one or more node pair strength scores to one or more node pairs of the multiple nodes based on one or more node pair strength assessments; and
identifying one or more first node pairs of the one or more node pairs of the multiple nodes having one or more first node pair strength scores of the one or more node pair strength scores that satisfy a threshold node pair strength score, the one or more first node pairs comprising the one or more primary node pairs;
any primary filtered search query of the one or more primary filtered search queries is not included in the one or more secondary filtered search queries;
the multiple leading search queries comprise the one or more primary filtered search queries and the one or more secondary filtered search queries;

the first visualization of the multiple nodes comprises a first table of the multiple nodes;

the second visualization of the one or more edge connectors comprises a second table of the one or more edge connectors;

identifying the multiple leading search queries comprises:

clustering together the multiple leading search queries using at least one of: (a) a uniform resource locator overlap assessment, (b) an auto-complete tool assessment, or (c) a keyword relation database assessment;

the one or more first node pairs comprise two or more first node pairs;

constructing the multiple visualizations comprising the first visualization of the multiple nodes and the second visualization of the one or more edge connectors associating one or more primary node pairs of the multiple nodes further comprises:

paring down the two or more first node pairs to one or more second node pairs;

the two or more first node pairs comprise the one or more second node pairs;

the one or more second node pairs consist of the one or more primary node pairs; and the input device and the output device are configured to permit an operator of the computer search engine optimization system to manage the one or more processors and the one or more non-transitory memory storage devices.

5. A computer search engine optimization method comprising:

executing one or more first computer instructions configured to receive a primary user search query;

executing one or more second computer instructions configured to construct a graphical visualization comprising multiple nodes and one or more edge connectors connecting one or more primary node pairs of the multiple nodes, the multiple nodes comprising a first node associated with the primary user search query and one or more second nodes associated with one or more primary filtered search queries of multiple leading search queries related to the primary user search query; and executing one or more third computer instructions configured to present the graphical visualization at an electronic display;

wherein:

executing the one or more second computer instructions comprises:

executing one or more fourth computer instructions configured to identify the multiple leading search queries;

executing one or more fifth computer instructions configured to identify the one or more primary filtered search queries and one or more secondary filtered search queries;

executing one or more sixth computer instructions configured to assign one or more node pair strength scores to one or more node pairs of the multiple nodes based on one or more node pair strength assessments; and executing one or more seventh computer instructions configured to identify one or more first node pairs of the one or more node pairs of the multiple nodes having one or more first node pair strength scores of the one or more node pair strength scores that satisfy a threshold node pair strength score, the one or more first node pairs comprising the one or more primary node pairs;

any primary filtered search query of the one or more primary filtered search queries is not included in the one or more secondary filtered search queries;

the multiple leading search queries comprise the one or more primary filtered search queries and the one or more secondary filtered search queries; and executing the one or more fourth computer instructions comprises:

executing one or more eighth computer instructions configured to cluster together the multiple leading search queries using at least one of: (a) a first uniform resource locator overlap assessment, (b) an auto-complete tool assessment, or (c) a keyword relation database assessment;

the one or more first node pairs comprise two or more first node pairs;

executing the one or more second computer instructions further comprises:

executing one or more ninth computer instructions configured to pare down the two or more first node pairs to one or more second node pairs;

the two or more first node pairs comprise the one or more second node pairs;

the one or more second node pairs consist of the one or more primary node pairs; and the one or more first computer instructions, the one or more second computer instructions, and the one or more third computer instructions are configured to run at one or more processors and configured to be stored at one or more non-transitory memory storage devices.

6. The computer search engine optimization method of claim 5 wherein:

executing the one or more fifth computer instructions comprises:

executing one or more tenth computer instructions configured to assign query scores to the multiple leading search queries based on at least one of: (a) one or more node architecture assessments or (b) one or more node quality assessments; and executing one or more eleventh computer instructions configured to identify one or more first filtered search queries of the multiple leading search queries having one or more first query scores of the query scores that satisfy a threshold query score, the first query scores being based on the at least one of: (a) the one or more node architecture assessments, or (b) the one or more node quality assessments.

7. The computer search engine optimization method of claim 6 further comprising:

executing one or more twelfth computer instructions configured to receive one or more secondary user search queries;

wherein:

executing the one or more fifth computer instructions further comprises:

executing one or more thirteenth computer instructions configured to cluster together the one or more first filtered search queries and the one or more secondary user search queries; and the one or more twelfth computer instructions are configured to run at the one or more processors and configured to be stored at the one or more non-transitory memory storage devices.

8. The computer search engine optimization method of claim 6 wherein:
- the one or more first filtered search queries comprise two or more first filtered search queries;
- executing the one or more fifth computer instructions further comprises:
  - executing one or more twelfth computer instructions configured to identify one or more second filtered search queries based on a connectedness assessment; and
- the two or more first filtered search queries comprising the one or more second filtered search queries.

9. The computer search engine optimization method of claim 6 wherein:
- the one or more node architecture assessments comprise a root node relationship assessment or a parent node relationship assessment; and
- the one or more node quality assessments comprise at least one of a query intention assessment, a query search volume assessment, a query seasonality assessment, a query cost per click assessment, a query click through rate assessment, a query type assessment, a competitor uniform resource locator assessment, or a buying cycle assessment.

10. The computer search engine optimization method of claim 6 wherein:
- the one or more node pairs of the multiple nodes further comprise one or more third node pairs, any node pairs of the one or more first node pairs not being included in the one or more third node pairs.

11. The computer search engine optimization method of claim 6 wherein:
- the one or more node pair strength assessments comprise a second uniform resource locator overlap assessment, a word2vec assessment, or a keyword source assessment.

12. The computer search engine optimization method of claim 5 wherein:
- executing the one or more ninth computer instructions comprises executing one or more tenth computer instructions configured to pare down the two or more first node pairs to the one or more second node pairs based on at least one of: (a) a triangle reduction assessment or (b) a planarity assessment.

13. The computer search engine optimization method of claim 5 wherein:
- executing the one or more second computer instructions further comprises:
- executing one or more tenth computer instructions configured to visually coordinate two or more nodes of the multiple nodes with a common visual identifier based on one or more node properties of the multiple nodes.

14. The computer search engine optimization method of claim 13 wherein at least one of:
- the one or more node properties comprise at least one of query intention data, query search volume data, query seasonality data, query cost per click data, query click through rate data, query type data, competitor uniform resource locator data, or buying cycle data; or
- the common visual identifier comprises at least one of a color or a pattern.

15. The computer search engine optimization method of claim 13 further comprising:
- executing one or more eleventh computer instructions configured to receive one or more node property selections of the one or more node properties of the multiple nodes;
- wherein:
  - the one or more eleventh computer instructions are configured to run at the one or more processors and configured to be stored at the one or more non-transitory memory storage devices.

16. The computer search engine optimization method of claim 5 further comprising:
- executing one or more tenth computer instructions configured to receive a node selection corresponding to a selected node of the multiple nodes; and
- responsive to executing the one or more tenth computer instructions, executing one or more eleventh computer instructions configured to present one or more node properties of the selected node of the multiple nodes at the electronic display;
- wherein:
  - the one or more tenth computer instructions and the one or more eleventh computer instructions are configured to run at the one or more processors and configured to be stored at the one or more non-transitory memory storage devices.

* * * * *